United States Patent
Hendry et al.

(10) Patent No.: US 10,404,990 B2
(45) Date of Patent: Sep. 3, 2019

(54) TEMPORAL MOTION VECTOR PREDICTION (TMVP) INDICATION IN MULTI-LAYER CODECS

(71) Applicant: QUALCOMM Incorporated, San Diego, CA (US)

(72) Inventors: Fnu Hendry, Poway, CA (US); Adarsh Krishnan Ramasubramonian, San Diego, CA (US); Ye-Kui Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 6 days.

(21) Appl. No.: 15/884,275

(22) Filed: Jan. 30, 2018

(65) Prior Publication Data

US 2018/0160132 A1   Jun. 7, 2018

Related U.S. Application Data

(63) Continuation of application No. 14/742,286, filed on Jun. 17, 2015, now abandoned.

(Continued)

(51) Int. Cl.

| | |
|---|---|
| *H04N 19/187* | (2014.01) |
| *H04N 19/50* | (2014.01) |
| *H04N 19/30* | (2014.01) |
| *H04N 19/597* | (2014.01) |
| *H04N 19/176* | (2014.01) |
| *H04N 19/172* | (2014.01) |
| *H04N 19/124* | (2014.01) |

(Continued)

(52) U.S. Cl.
CPC ......... *H04N 19/187* (2014.11); *H04N 19/105* (2014.11); *H04N 19/124* (2014.11); *H04N 19/172* (2014.11); *H04N 19/176* (2014.11); *H04N 19/30* (2014.11); *H04N 19/31* (2014.11); *H04N 19/50* (2014.11); *H04N 19/51* (2014.11); *H04N 19/52* (2014.11); *H04N 19/597* (2014.11); *H04N 19/70* (2014.11)

(58) Field of Classification Search
CPC ........................................................ H04N 19/70
See application file for complete search history.

(56) References Cited

U.S. PATENT DOCUMENTS

| | | |
|---|---|---|
| 2015/0373343 A1 | 12/2015 | Hendry |
| 2015/0373350 A1 | 12/2015 | Hendry |

OTHER PUBLICATIONS

Response to Written Opinion dated Sep. 15, 2015, from International Application No. PCT/US2015/036479, filed on Apr. 19, 2016, 14 pp.

(Continued)

*Primary Examiner* — Young Lee

(74) *Attorney, Agent, or Firm* — Shumaker & Sieffert, P.A.

(57) ABSTRACT

An apparatus for coding video information according to certain aspects includes a memory and a processor configured to: determine a value of a first flag indicative of whether preceding pictures that precede a current picture in a current layer in decoding order are used for temporal motion vector prediction (TMVP) of subsequent pictures that follow the current picture in the current layer in decoding order, the first flag associated with the current picture; and refrain from using the preceding pictures in the current layer as reference pictures for TMVP of the current picture, in response to determining that the value of the first flag indicates that the preceding pictures in the current layer should not be used for TMVP of the subsequent pictures in the current layer.

10 Claims, 10 Drawing Sheets

Related U.S. Application Data

(60) Provisional application No. 62/015,378, filed on Jun. 20, 2014.

(51) Int. Cl.
　　　*H04N 19/105*　　(2014.01)
　　　*H04N 19/31*　　(2014.01)
　　　*H04N 19/51*　　(2014.01)
　　　*H04N 19/70*　　(2014.01)
　　　*H04N 19/52*　　(2014.01)

(56) References Cited

OTHER PUBLICATIONS

Second Written Opinion from International Application No. PCT/US2015/036479, dated Jun. 2, 2016, 6 pp.
Response to Second Written Opinion dated Jun. 2, 2016, from International Application No. PCT/US2015/036479, filed on Jul. 20, 2016, 14 pp.
International Preliminary Report on Patentability from International Application No. PCT/US2015/036479, filed on Sep. 21, 2016, 9 pp.
ITU-T H.265, Series H: Audiovisual and Multimedia Systems, Infrastructure of audiovisual services—Coding of moving video, Advanced video coding for generic audiovisual services, The International Telecommunication Union, Apr. 2015, 634 pp.
Bross et al., "High Efficiency Video Coding (HEVC) text specification draft 10 (for FDIS & Last Call)," 12th Meeting: Geneva, CH, Jan. 14-23, 2013 (Joint Collaborative Team on Video Coding of ISO/IEC JTC1/SC29/WG11 and ITU-T SG.16); JCTVC-L1003_v34, Mar. 19, 2013, 310 pp.
Boyce J., "BoG report on SHVC/MV-HEVC HLS topics", 15. JCT-VC Meeting; Oct. 23, 2013-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-O0349-v6, Oct. 30, 2013 (Oct. 30, 2013), pp. 1-25, XP030115429, bottom of p. 16 section 1.4.
Chen J., et al., "SHVC Draft Text 1", Joint Collaborative Team on Video Coding (JCT-VC) of ITU-T SG16 WP3 and ISO/IEC JTC1/SC29/WG11, 12th Meeting: Geneva, CH, JCTVC-L1008, Jan. 14-23, 2013, pp. 1-34.
Deshpande S., "On Source Representation Information Signaling in VPS", 14. JCT-VC Meeting, Jul. 25, 2013-Aug. 2, 2013, Vienna, (Joint Collaborative Team on Video Coding of ISO/IEC JTC1/SC29/WG11 and ITU-T SG.16 ), URL: http://wftp3.itu.int/av-arch/jctvc-site/,, No. JCTVC-N0238, Jul. 16, 2013 (Jul. 16, 2013), XP030114750, the whole document.
Hannuksela (Nokia) M M: "MV-HEVC/SHVC HLS: On slice temporal mvp enabled flag", 17. JCT-VC Meeting; Mar. 27, 2514-Apr. 4, 2014; Valencia; (Joint Collaborative Team on Video Coding of ISO/IEC JTC1/SC29/WG11 and ITU-T SG.16 ); URL: http://wftp3.itu.int/av-arch/jctvc-site/. No. JCTVC-Q0189-v2, Mar. 30, 2014 (Mar. 30, 2014), XP030116141.
Hannuksela (Nokia) M M: "MV-HEVC/SHVC HLS: on storage of motion fields", 14. JCT-VC Meeting; Jul. 25, 2013-Aug. 2, 2013; Vienna; (Joint Collaborative Team on Video Coding of ISO/IEC JTC1/5C29/WG11 and ITU-T SG.16 ); URL: http://wftp3.itu.int/av-arch/jctvc-site/, No. JCTVC-N0064-v3, Jul. 29, 2013 (Jul. 29, 2013), XP030114500.
He Y., et al., "AHG9: On high level syntax", 15. JCT-VC Meeting; Oct. 23, 2013-Nov. 1, 2013; Geneva ; (Joint Collaborative Team on Video Coding of ISO/IEC JTC1/SC29/WG11 and ITU-T SG.16); URL:http://wftp3.itu.int/av-arch/jctvc-site/ , No. JCTVC-O0096, Oct. 14, 2013, XP030115084, 5 Pages.
Hendry et al., "MV-HEVC/SHVC HLS: On indication of the use of temporal motion vector prediction", 18. JCT-VC Meeting; Jun. 30, 2014-Jul. 9, 2014; Sapporo; (Joint Collaborative Team on Video Coding of ISO/IEC JTC1/5C29/WG11 and ITU-T SG.16 ); URL: http://wftp3.itu.int/av-arch/jctvc-site/,,No. JCTVC-R0226, Jun. 21, 2014 (Jun. 21, 2014), XP030116525.
International Search Report and Written Opinion—PCT/US2015/036479—ISA/EPO—dated Sep. 15, 2015.
Ramasubramonian A. K. et al., "MV-HEVC/SHVC HLS: Representation Format Information in VPS", 14. JCT-VC Meeting, Jul. 25, 2013-Aug. 2, 2013, Vienna, (Joint Collaborative Team on Video Coding of ISO/IEC JTC1/SC29/WG11 and ITU-T SG.16 ), URL: http://wftp3.itu.int/av-arch/jctvc-site/,, No. JCTVC-N0092-v2, Jul. 28, 2013 (Jul. 28, 2013), XP030114539, the whole document.
Tech G, et al., "MV-HEVC Draft Text 8", 8. JCT-3V Meeting, Mar. 29, 2014-Apr. 4, 2014, Valencia, (The Joint Collaborative Team on 3d Video Coding Extension Development of ISO/IEC JTC1/SC29/WG11 and ITU-T SG.16 ), URL: http://phenix.int-evry.fr/jct3v/, JCT3V-H1002-v5, Jun. 3, 2014, XP030132292, 164 pages.
Wang Y-K., et al., "MV-HEVC/SHVC HLS: Miscellaneous Cleanups", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/, No. JCTVC-R0227, Jun. 21, 2014 (Jun. 21, 2014), pp. 1-6, XP030116527, section 1.3.
Wang Y-K., et al., "MV-HEVC/SHVC HLS: On VPS and SPS in HEVC 3DV and scalable extensions", 4. JCT-3V Meeting; Apr. 20, 2013-Apr. 26, 2013; Incheon; (The Joint Collaborative Team on 3D Video Coding Extension Development of ISO/IEC JTC1/SC29/WG11 and ITU-T SG.16); URL: http://phenix.int-evry.fr/jct2/, No. JCT3V-D0047, Apr. 10, 2013 (Apr. 10, 2013), pp. 1-22, XP030130711.
Yu Y., et al., "Modification of slice temporal_mvp_enable_flag", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16 ); URL: http://wftp3.itu.int/av-arch/jctvc-site/, No. JCTVC-K0251, Oct. 2, 2012 (Oct. 2, 2012), XP030113133.

TEMPORAL MOTION VECTOR PREDICTION (TMVP) INDICATION IN MULTI-LAYER CODECS

INCORPORATION BY REFERENCE TO ANY PRIORITY APPLICATIONS

This application is a continuation of U.S. application Ser. No. 14/742,286, filed Jun. 17, 2015, which claims the benefit of U.S. Provisional Application No. 62/015,378, filed Jun. 20, 2014. Each of these applications is incorporated by reference herein in its entirety. Any and all applications for which a foreign or domestic priority claim is identified in the Application Data Sheet as filed with the present application are hereby incorporated by reference under 37 CFR 1.57.

TECHNICAL FIELD

This disclosure relates to the field of video coding and compression, including both single-layer video coding and multi-layer video coding. Multi-layer video coding can include scalable video coding, multiview video coding, three-dimensional (3D) video coding, etc.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

The systems, methods and devices of this disclosure each have several innovative aspects, no single one of which is solely responsible for the desirable attributes disclosed herein. The details of one or more examples are set forth in the accompanying drawings and the description below, which are not intended to limit the full scope of the inventive concepts described herein. Other features, objects, and advantages will be apparent from the description and drawings, and from the claims.

Scalable video coding (SVC) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise ratio (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or 3D extension of the HEVC standard, there may be multiple views, and information of one view may be utilized to code (e.g., encode or decode) the information of another view (e.g., motion estimation, motion vector prediction and/or other redundancies).

An apparatus for coding video information according to certain aspects includes a memory and a processor. The memory is configured to store video information associated with a plurality of layers. The processor is configured to obtain information associated with a current access unit (AU) to be coded, the current AU containing pictures from a plurality of layers, the plurality of layers including a current layer to be coded, the current layer including a current picture to be coded. The processor is further configured to determine a value of a first flag indicative of whether preceding pictures that precede the current picture in the current layer in decoding order are used for temporal motion vector prediction (TMVP) of subsequent pictures that follow the current picture in the current layer in decoding order, the first flag associated with the current picture. The processor is additionally configured to refrain from using the preceding pictures in the current layer as reference pictures for TMVP of the current picture, in response to determining that the value of the first flag indicates that the preceding pictures in the current layer should not be used for TMVP of the subsequent pictures in the current layer.

An apparatus for coding video information according to certain aspects includes a memory and a processor. In one embodiment, the apparatus is for encoding video information. The memory is configured to store video information associated with a plurality of layers. The processor is configured to receive a video parameter set (VPS) including one or more representation format syntax structures, the VPS indicating a first representation format syntax structure of the one or more representation format syntax structures associated with a first layer of the plurality of layers. The processor is further configured to receive a sequence parameter set (SPS) including (1) a reference to a second representation format syntax structure of the one or more representation format syntax structures in the VPS or (2) a third representation format syntax structure not included in the one or more representation format syntax structures in the VPS, each representation format syntax structure including a first flag indicative of whether to code color components of chroma format of a layer separately. The processor is additionally configured to update a value of a first variable indicative of whether to code color components of chroma format of a layer separately without referring to a value of the first flag in the first representation format syntax structure, the first variable associated with the first layer.

DETAILED DESCRIPTION

Figure 1A:
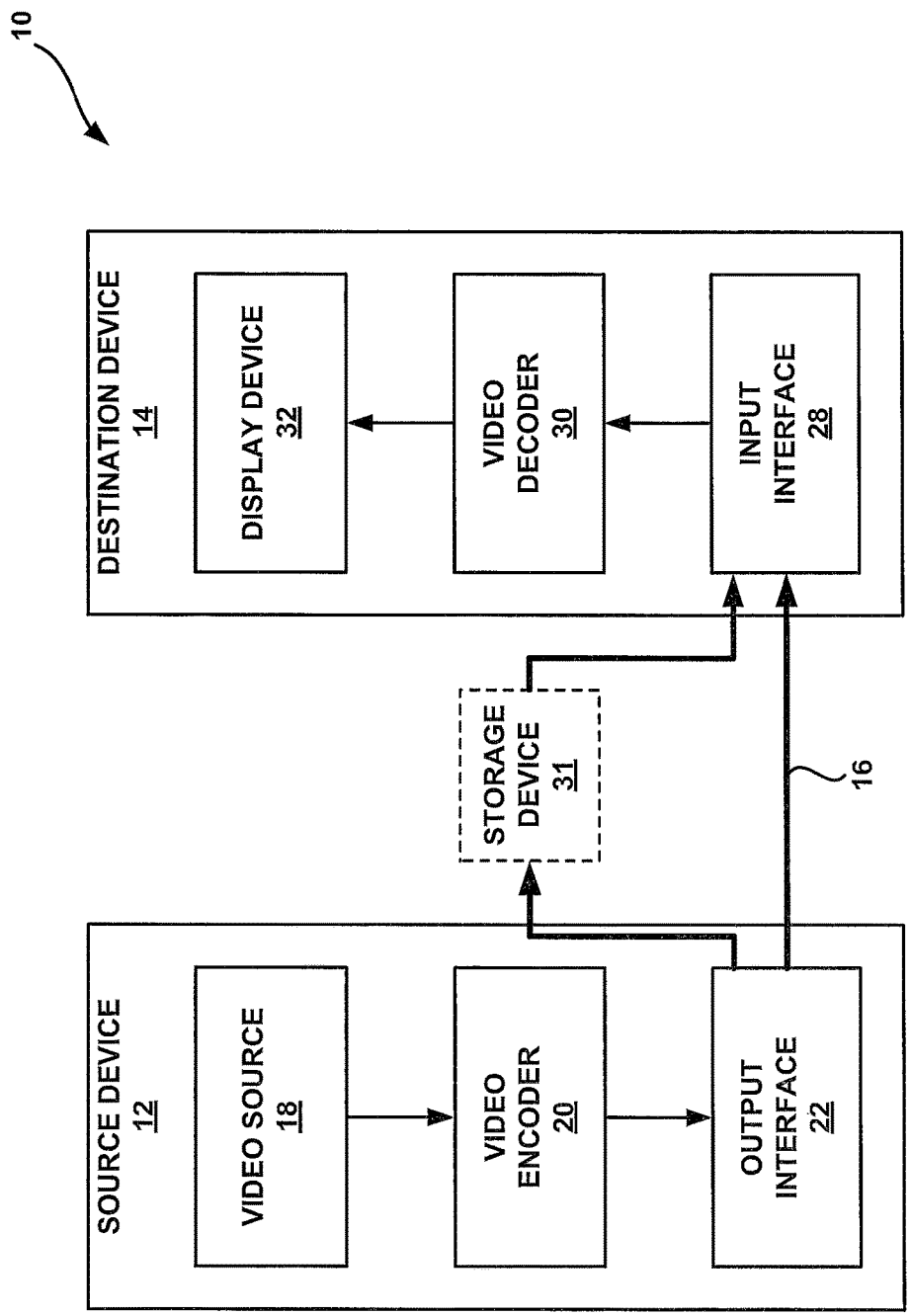
FIG. 1A is a block diagram illustrating an example video encoding and decoding system that may utilize techniques in accordance with aspects described in this disclosure.

In general, this disclosure relates to single layer coding as well as inter-layer prediction for scalable video coding in the context of advanced video codecs, such as HEVC (High Efficiency Video Coding). More specifically, the present disclosure relates to systems and methods for temporal motion vector prediction (TMVP) indication and representation format update in multi-layer codecs.

In the description below, H.264/Advanced Video Coding (AVC) techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization (ISO) and the International Electrotechnical Commission (IEC) (ISO/IEC) Moving Picture Experts Group (MPEG) 1 (MPEG-1) Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

HEVC generally follows the framework of previous video coding standards in many respects. The unit of prediction in HEVC is different from the units of prediction (e.g., macroblock) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as the base layer, and a higher layer such as the enhancement layer) of video data. A "layer" of video data may generally refer to a sequence of pictures having at least one common characteristic, such as a view, a frame rate, a resolution, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. That is, a view of video data may be referred to as a layer of video data, and a layer of video data may be referred to as a view of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its SVC and MVC extensions.

In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Moving Picture Experts Group (MPEG). The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively.

Overview

Early versions of SHVC and MV-HEVC (e.g., SHVC Working Draft 6, MV-HEVC Working Draft 8, etc.) implement a restriction that temporal motion vector from pictures that precede the current picture in decoding order should not be used in TMVP of any pictures that follow the current picture in decoding order when the values of both slice_temporal_mvp_enabled_flag and temporal ID of the current picture are equal to 0 and when the pictures belong to the base layer (e.g., a layer having layer ID=0). Slice_temporal_mvp_enabled_flag can indicate whether the current picture in a slice can use TMVP, for example, based on preceding pictures of the current picture as reference pictures (e.g., collocated pictures). The restriction and the condition that the pictures belong to the base layer were introduced, for example, to allow the enhancement layer to use TMVP. However, the enhancement layer may use TMVP without limiting the restriction to the base layer.

The early versions of SHVC and MV-HEVC also add a new SEI message called TMVP constraints SEI message, which provides an indication of whether pictures of the current layer that precede the current picture should not be used as collocated pictures in TMVP for any subsequent picture of the same layer. For example, the TMVP constraints SEI message can include a flag called prev_pics_not_used_flag that indicates whether the preceding pictures of the current picture in the current layer in decoding order can be used for TMVP of subsequent pictures of the current picture in the current layer in decoding order. However, the semantics of prev_pics_not_used_flag in the early versions of SHVC and MV-HEVC can lead to a conflict with slice_temporal_mvp_enabled_flag. For instance, slice_temporal_mvp_enabled_flag in the slice header of the slice containing the current picture is equal to 1 and indicates that the current picture can use TMVP, referring to preceding pictures of the current picture as collocated pictures, but prev_pics_not_used_flag in the TMVP constraints SEI message for the current picture is equal to 1 and indicates that subsequent pictures of the current picture in decoding should not use preceding pictures of the current picture for TMVP in decoding order. In such case, any error introduced in the TMVP of the current picture using preceding pictures may be propagated to the subsequent pictures since the subsequent pictures could use the current picture as a collocated picture for TMVP. Although the subsequent pictures are not using any preceding pictures of the current picture for TMVP, the subsequent pictures may use the current picture itself for TMVP.

In order to address these and other challenges, the techniques according to certain aspects can apply the restriction that temporal motion vector from any preceding pictures of the current picture should not be used in TMVP of any subsequent pictures of the current picture in decoding order to all layers. For example, the restriction can apply to pictures when slice_temporal_mvp_enabled_flag=0 and temporal ID=0 regardless of whether the pictures belong to the base layer or other layers. In one example, the TMVP constraints SEI message can be used with slice_temporal_mvp_enabled_flag to allow an enhancement layer to use TMVP without limiting the restriction to the base layer.

Moreover, the techniques can modify the semantics of prev_pics_not_used_flag, for example, to resolve the conflict between slice_temporal_mvp_enabled_flag for the current picture and prev_pics_not_used_flag for the current picture. For instance, prev_pics_not_used_flag can take a higher precedence than slice_temporal_mvp_enabled_flag. In one example, prev_pics_not_used_flag is modified to indicate that preceding pictures of the current picture should not be used for TMVP of the current picture as well as the subsequent pictures of the current picture in decoding order.

The restriction imposed by slice_temporal_mvp_enabled_flag and the restriction imposed by prev_pics_not_used_flag may be implemented for error resilience purposes. However, when both slice_temporal_mvp_enabled_flag and prev_pics_not_used_flag are equal to 1, any error in the TMVP of the current picture can still be introduced in the TMVP of the subsequent pictures of the current picture in decoding order. By disallowing both the current picture and the subsequent pictures from using the preceding pictures of the current picture in TMVP, error resilience can be significantly improved and increased.

Further, in the early versions of SHVC and MV-HEVC, the values of syntax elements or flags in a VPS are used to constrain the values of corresponding syntax elements or flags in a SPS. The VPS and the SPS can both include representation format information. The representation format information can include picture width and height (e.g., picture size), bit depth of chroma components, bit depth of luma components, color plane information, conformance window size. The VPS can apply to all the layers, and generally, one VPS can be defined for a bitstream. The SPS can be specific to a particular layer, and multiple SPSs can be present if a bitstream includes multiple sequences. In general, the values in the VPS represent the worst case scenario values or maximum values, and the SPS can specify different values that are less than or equal to the values in the VPS as appropriate. Accordingly, the values of syntax elements or flags in the VPS can constrain the values of corresponding syntax elements or flags in the SPS when representation format information is updated for the SPS. However, for certain syntax elements or flags, it is unclear whether a worst case scenario value or a maximum value is applicable. One example can be a flag having a value of either 0 or 1.

In order to address these and other challenges, the techniques according to certain aspects can remove the constraint for separate_colour_plane_flag in the representation format. Separate_colour_plane_flag can indicate whether the three colour components (e.g., Y, Cb, or Cr) of the chroma format are coded separately or not. When the value of separate_colour_plane_flag is to be updated in an SPS, the techniques does not have to check whether the desired value of separate_colour_plane_flag is less than or equal to the value of separate_colour_plane_flag in the VPS. In this way, the value of separate_colour_plane_flag can be updated in the SPS in a more flexible manner, and the update of separate_colour_plane_flag in representation format can be more efficient.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
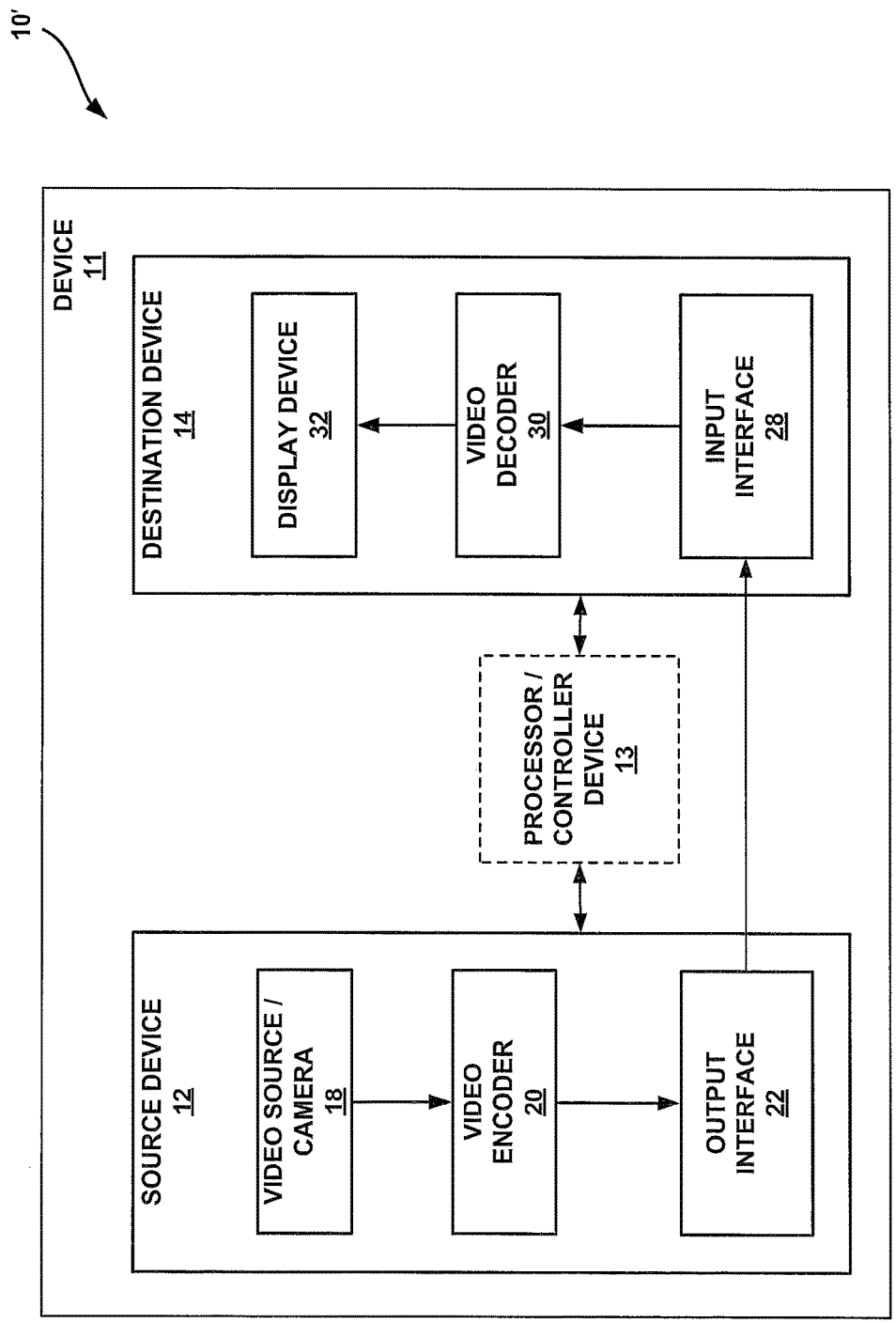
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source and destination devices 12, 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to an optional storage device 31. Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network (WLAN) connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, a video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones," as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A, the video encoder 23 illustrated in FIG. 2B, or any other video encoder described herein.

In the example of FIG. 1A, the destination device 14 includes an input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated FIG. 3A, the video decoder 33 illustrated in FIG. 3B, or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video encoding and decoding system 10' wherein the source and destination devices 12, 14 are on or part of a device 11. The device 11 may be a telephone handset, such as a "smart" phone or the like. The device 11 may include an optional controller/processor device 13 in operative communication with the source and destination devices 12, 14. The system 10' of FIG. 1B, and components thereof, are otherwise similar to the system 10 of FIG. 1A, and components thereof.

The video encoder 20 and the video decoder 30 may operate according to a video compression standard, such as the HEVC, and may conform to a HEVC Test Model (HM). Alternatively, the video encoder 20 and video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include video parameter sets (VPS), sequence parameter sets (SPSs), picture parameter sets (PPSs), adaptation parameter sets (APSs), and other syntax structures. A SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, the video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). The video encoder 20 may use quadtree partitioning to partition the video blocks of treeblocks into video blocks associated with CUs, hence the name "treeblocks."

In some examples, the video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

To generate a coded slice, the video encoder 20 may perform encoding operations on each treeblock in a slice. When the video encoder 20 performs an encoding operation on a treeblock, the video encoder 20 may generate a coded treeblock. The coded treeblock may comprise data representing an encoded version of the treeblock.

When the video encoder 20 generates a coded slice, the video encoder 20 may perform encoding operations on (e.g., encode) the treeblocks in the slice according to a raster scan order. For example, the video encoder 20 may encode the treeblocks of the slice in an order that proceeds from left to right across a topmost row of treeblocks in the slice, then from left to right across a next lower row of treeblocks, and so on until the video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, the video encoder 20 may be able to access information generated by encoding treeblocks above and to the left of the given treeblock when encoding the given treeblock. However, the video encoder 20 may be unable to access information generated by encoding treeblocks below and to the right of the given treeblock when encoding the given treeblock.

To generate a coded treeblock, the video encoder 20 may recursively perform quadtree partitioning on the video block of the treeblock to divide the video block into progressively smaller video blocks. Each of the smaller video blocks may be associated with a different CU. For example, the video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times the video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

The video encoder 20 may perform encoding operations on (e.g., encode) each CU of a treeblock according to a z-scan order. In other words, the video encoder 20 may encode a top-left CU, a top-right CU, a bottom-left CU, and then a bottom-right CU, in that order. When the video encoder 20 performs an encoding operation on a partitioned CU, the video encoder 20 may encode CUs associated with sub-blocks of the video block of the partitioned CU according to the z-scan order. In other words, the video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, the video encoder 20 may be able to access information generated by encoding some CUs that neighbor the given CU when encoding the given CU. However, the video encoder 20 may be unable to access information generated by encoding other CUs that neighbor the given CU when encoding the given CU.

When the video encoder 20 encodes a non-partitioned CU, the video encoder 20 may generate one or more prediction units (PUs) for the CU. Each of the PUs of the CU may be associated with a different video block within the video block of the CU. The video encoder 20 may generate a predicted video block for each PU of the CU. The predicted video block of a PU may be a block of samples. The video encoder 20 may use intra prediction or inter prediction to generate the predicted video block for a PU.

When the video encoder 20 uses intra prediction to generate the predicted video block of a PU, the video encoder 20 may generate the predicted video block of the PU based on decoded samples of the picture associated with the PU. If the video encoder 20 uses intra prediction to generate predicted video blocks of the PUs of a CU, the CU is an intra-predicted CU. When the video encoder 20 uses inter prediction to generate the predicted video block of the PU, the video encoder 20 may generate the predicted video block of the PU based on decoded samples of one or more pictures other than the picture associated with the PU. If the video encoder 20 uses inter prediction to generate predicted video blocks of the PUs of a CU, the CU is an inter-predicted CU.

Furthermore, when the video encoder 20 uses inter prediction to generate a predicted video block for a PU, the video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. The video encoder 20 may generate the predicted video block for the PU based on the reference blocks of the PU.

After the video encoder 20 generates predicted video blocks for one or more PUs of a CU, the video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, the video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

The video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, the video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

The video encoder 20 may associate each CU with a quantization parameter (QP) value. The QP value associated with a CU may determine how the video encoder 20 quantizes transform coefficient blocks associated with the CU. The video encoder 20 may adjust the degree of quantization applied to the transform coefficient blocks associated with a CU by adjusting the QP value associated with the CU.

After the video encoder 20 quantizes a transform coefficient block, the video encoder 20 may generate sets of syntax elements that represent the transform coefficients in the quantized transform coefficient block. The video encoder 20 may apply entropy encoding operations, such as Context Adaptive Binary Arithmetic Coding (CABAC) operations, to some of these syntax elements. Other entropy coding techniques such as context adaptive variable length coding (CAVLC), probability interval partitioning entropy (PIPE) coding, or other binary arithmetic coding could also be used.

The bitstream generated by the video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

The video decoder 30 may receive the bitstream generated by the video encoder 20. The bitstream may include a coded representation of the video data encoded by the video encoder 20. When the video decoder 30 receives the bitstream, the video decoder 30 may perform a parsing operation on the bitstream. When the video decoder 30 performs the parsing operation, the video decoder 30 may extract syntax elements from the bitstream. The video decoder 30 may reconstruct the pictures of the video data based on the syntax elements extracted from the bitstream. The process to reconstruct the video data based on the syntax elements may be generally reciprocal to the process performed by the video encoder 20 to generate the syntax elements.

After the video decoder 30 extracts the syntax elements associated with a CU, the video decoder 30 may generate predicted video blocks for the PUs of the CU based on the syntax elements. In addition, the video decoder 30 may inverse quantize transform coefficient blocks associated with TUs of the CU. The video decoder 30 may perform inverse transforms on the transform coefficient blocks to reconstruct residual video blocks associated with the TUs of the CU. After generating the predicted video blocks and reconstructing the residual video blocks, the video decoder 30 may reconstruct the video block of the CU based on the predicted video blocks and the residual video blocks. In this way, the video decoder 30 may reconstruct the video blocks of CUs based on the syntax elements in the bitstream.

Video Encoder

Figure 2A:
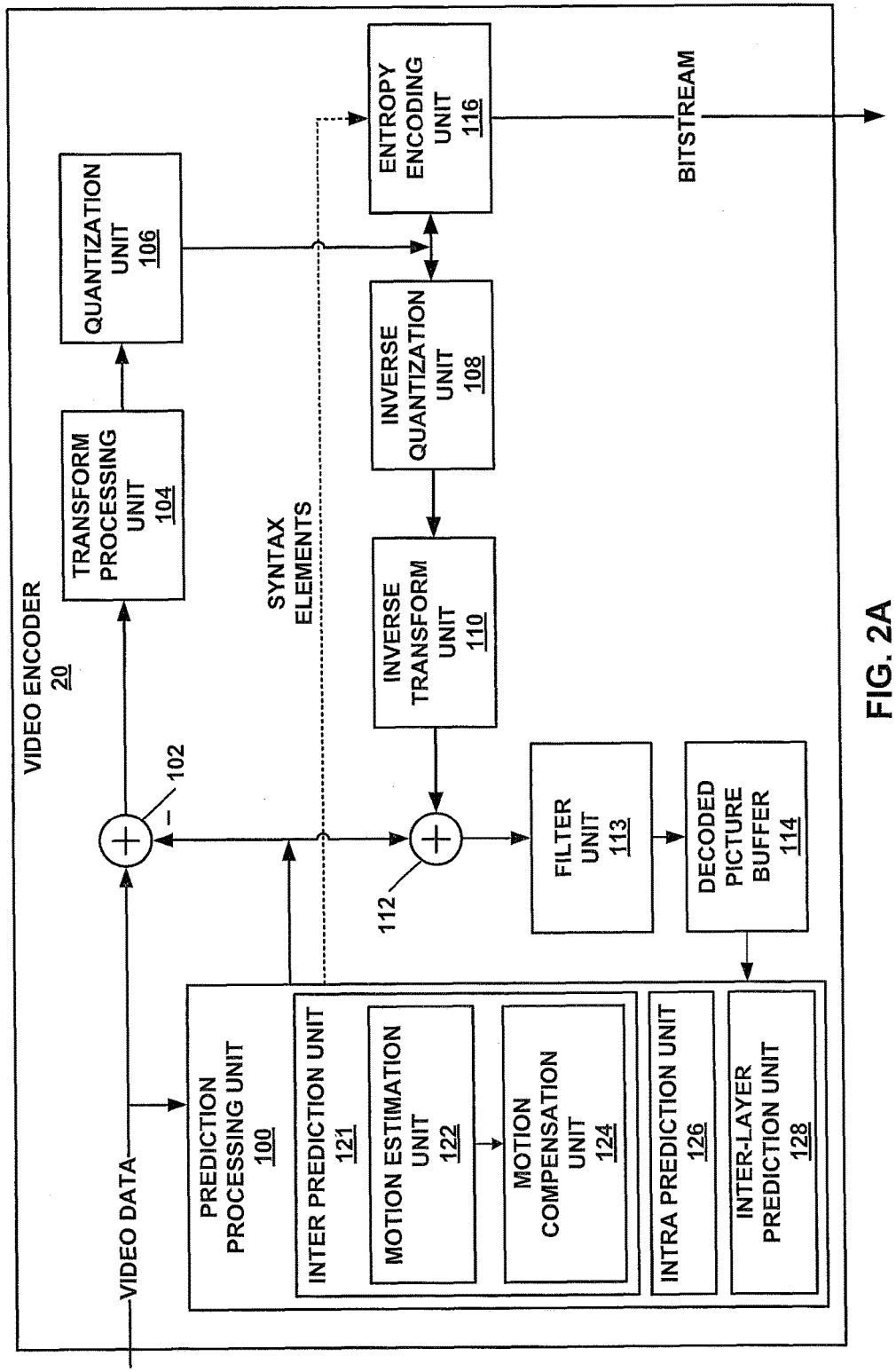
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to process a single layer of a video frame, such as for HEVC. Further, the video encoder 20 may be configured to perform any or all of the techniques of this disclosure, including but not limited to the methods of inferring NoOutputOfPriorPicsFlag and related processes described in greater detail above and below with respect to FIGS. 4 and 5. As one example, prediction processing unit 100 may be configured to perform any or all of the techniques described in this disclosure. In another embodiment, the video encoder 20 includes an optional inter-layer prediction unit 128 that is configured to perform any or all of the techniques described in this disclosure. In other embodiments, inter-layer prediction can be performed by prediction processing unit 100 (e.g., inter prediction unit 121 and/or intra prediction unit 126), in which case the inter-layer prediction unit 128 may be omitted. However, aspects of this disclosure are not so limited. In some examples, the techniques described in this disclosure may be shared among the various components of the video encoder 20. In some examples, additionally or alternatively, a processor (not shown) may be configured to perform any or all of the techniques described in this disclosure.

For purposes of explanation, this disclosure describes the video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of the video encoder 20 may be duplicated for processing of a multi-layer codec.

The video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, the video encoder 20 includes a plurality of functional components. The functional components of the video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, the video encoder 20 may include more, fewer, or different functional components. Furthermore, motion estimation unit 122 and motion compensation unit 124 may be highly integrated, but are represented in the example of FIG. 2A separately for purposes of explanation.

The video encoder 20 may receive video data. The video encoder 20 may receive the video data from various sources. For example, the video encoder 20 may receive the video data from video source 18 (e.g., shown in FIG. 1A or 1B) or another source. The video data may represent a series of pictures. To encode the video data, the video encoder 20 may perform an encoding operation on each of the pictures. As part of performing the encoding operation on a picture, the video encoder 20 may perform encoding operations on each slice of the picture. As part of performing an encoding operation on a slice, the video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

The video encoder 20 may perform encoding operations on each non-partitioned CU of a treeblock. When the video encoder 20 performs an encoding operation on a non-partitioned CU, the video encoder 20 generates data representing an encoded representation of the non-partitioned CU.

As part of performing an encoding operation on a CU, prediction processing unit 100 may partition the video block of the CU among one or more PUs of the CU. The video encoder 20 and the video decoder 30 may support various PU sizes. Assuming that the size of a particular CU is 2N×2N, the video encoder 20 and the video decoder 30 may support PU sizes of 2N×2N or N×N, and inter-prediction in symmetric PU sizes of 2N×2N, 2N×N, N×2N, N×N, 2N×nU, nL×2N, nR×2N, or similar. The video encoder 20 and the video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to the video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. The video decoder 30 may use the motion vector of the indicated neighboring PU and the motion vector difference to determine the motion vector of the PU. By referring to the motion information of a first PU when signaling the motion information of a second PU, the video encoder 20 may be able to signal the motion information of the second PU using fewer bits.

As further discussed below with reference to FIGS. 6-7, the prediction processing unit 100 may be configured to code (e.g., encode or decode) the PU (or any other reference layer and/or enhancement layer blocks or video units) by performing the methods illustrated in FIGS. 6-7. For example, inter prediction unit 121 (e.g., via motion estimation unit 122 and/or motion compensation unit 124), intra prediction unit 126, or inter-layer prediction unit 128 may be configured to perform the methods illustrated in FIGS. 6-7, either together or separately.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

The video encoder 20 may associate a QP value with a CU in various ways. For example, the video encoder 20 may perform a rate-distortion analysis on a treeblock associated with the CU. In the rate-distortion analysis, the video encoder 20 may generate multiple coded representations of the treeblock by performing an encoding operation multiple times on the treeblock. The video encoder 20 may associate different QP values with the CU when the video encoder 20 generates different encoded representations of the treeblock. The video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, the video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of the video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, the video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
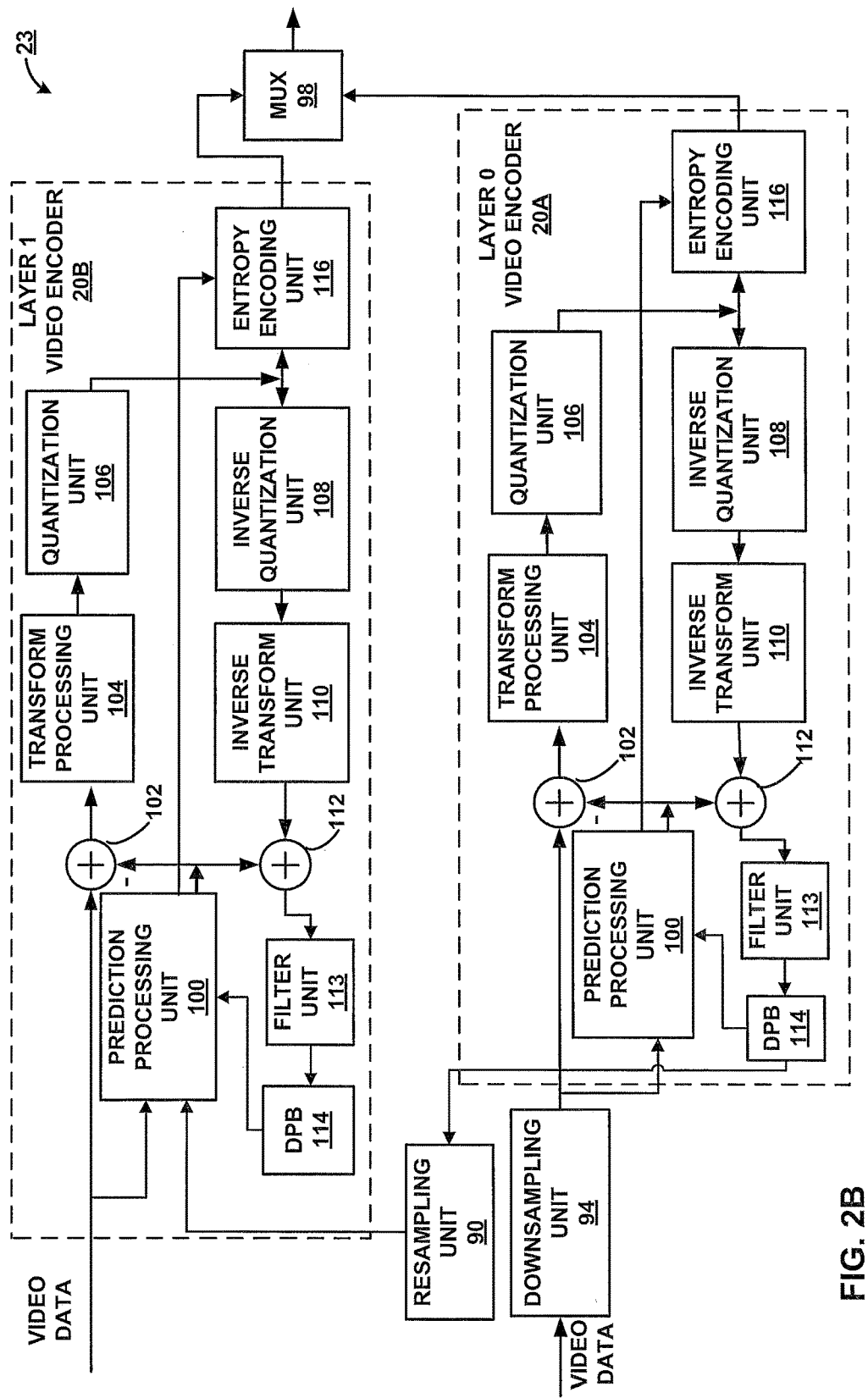
FIG. 2B is a block diagram illustrating an example of a video encoder that may implement techniques in accordance with aspects described in this disclosure.

FIG. 2B is a block diagram illustrating an example of a multi-layer video encoder 23 (also simply referred to as video encoder 23) that may implement techniques in accordance with aspects described in this disclosure. The video encoder 23 may be configured to process multi-layer video frames, such as for SHVC and multiview coding. Further, the video encoder 23 may be configured to perform any or all of the techniques of this disclosure.

The video encoder 23 includes a video encoder 20A and video encoder 20B, each of which may be configured as the video encoder 20 and may perform the functions described above with respect to the video encoder 20. Further, as indicated by the reuse of reference numbers, the video encoders 20A and 20B may include at least some of the systems and subsystems as the video encoder 20. Although the video encoder 23 is illustrated as including two video encoders 20A and 20B, the video encoder 23 is not limited as such and may include any number of video encoder 20 layers. In some embodiments, the video encoder 23 may include a video encoder 20 for each picture or frame in an access unit. For example, an access unit that includes five pictures may be processed or encoded by a video encoder that includes five encoder layers. In some embodiments, the video encoder 23 may include more encoder layers than frames in an access unit. In some such cases, some of the video encoder layers may be inactive when processing some access units.

In addition to the video encoders 20A and 20B, the video encoder 23 may include an resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may upsample the spatial size or number of pixels of the base layer, but the number of slices or the POC may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., the video encoder 20A) and to upsample the picture (or the received picture information). This upsampled picture may then be provided to the prediction processing unit 100 of a higher layer encoder (e.g., the video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of the video encoder 20A may be provided directly, or at least without being provided to the resampling unit 90, to the prediction processing unit 100 of the video encoder 20B. For example, if video data provided to the video encoder 20B and the reference picture from the decoded picture buffer 114 of the video encoder 20A are of the same size or resolution, the reference picture may be provided to the video encoder 20B without any resampling.

In some embodiments, the video encoder 23 downsamples video data to be provided to the lower layer encoder using the downsampling unit 94 before provided the video data to the video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, the video encoder 23 may further include a multiplexor 98, or mux. The mux 98 can output a combined bitstream from the video encoder 23. The combined bitstream may be created by taking a bitstream from each of the video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of the video encoders 20A and 20B. For instance, two blocks may be output from the video encoder 20B for each block output from the video encoder 20A. In some embodiments, the output stream from the mux 98 may be preprogrammed. In other embodiments, the mux 98 may combine the bitstreams from the video encoders 20A, 20B based on a control signal received from a system external to the video encoder 23, such as from a processor on a source device including the source device 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from the video encoder 23.

Video Decoder

Figure 3A:
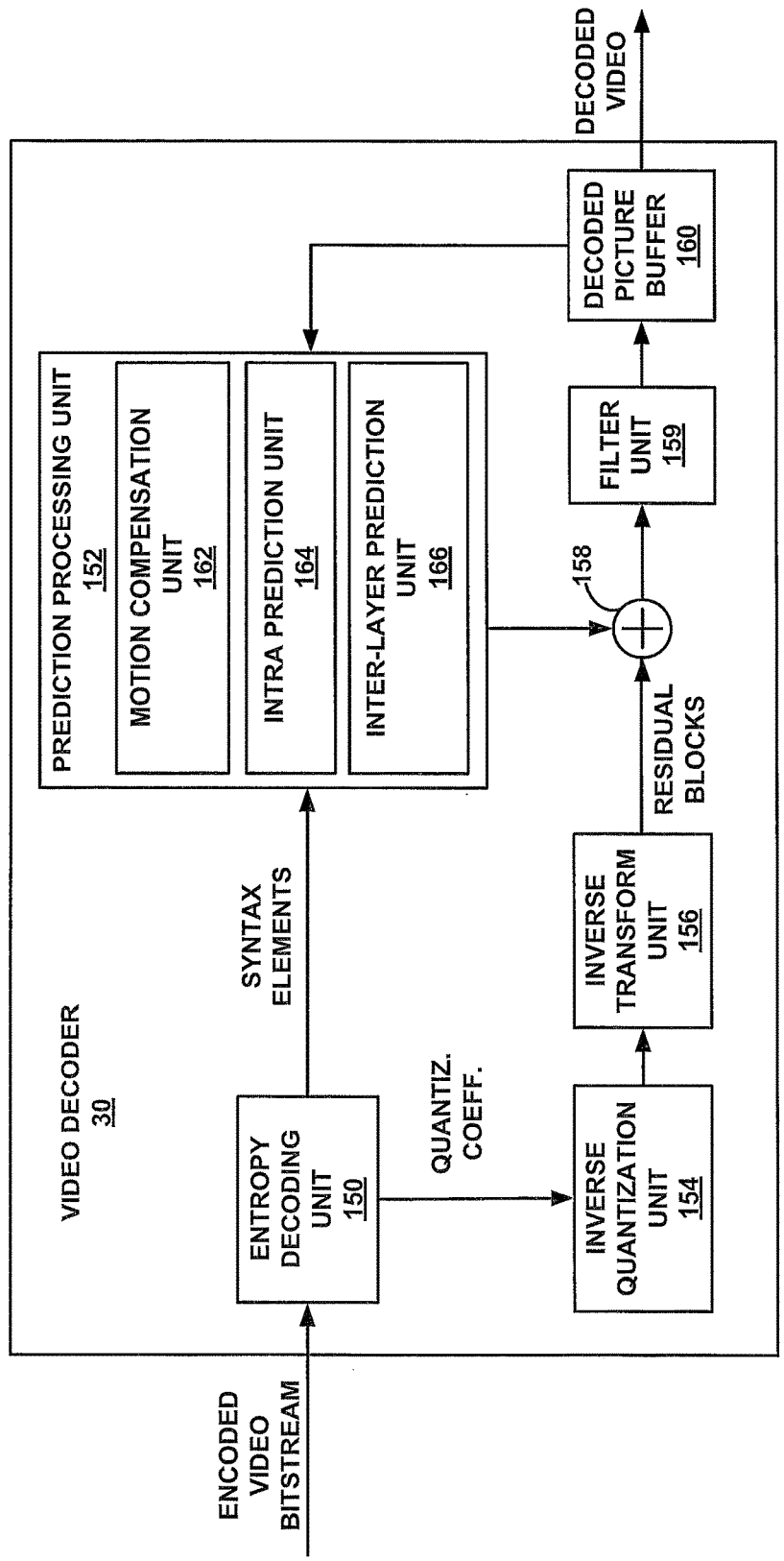
FIG. 3A is a block diagram illustrating an example of a video decoder that may implement techniques in accordance with aspects described in this disclosure.

FIG. 3A is a block diagram illustrating an example of the video decoder 30 that may implement techniques in accordance with aspects described in this disclosure. The video decoder 30 may be configured to process a single layer of a video frame, such as for HEVC. Further, the video decoder 30 may be configured to perform any or all of the techniques of this disclosure, including but not limited to the methods of inferring NoOutputOfPriorPicsFlag and related processes described in greater detail above and below with respect to FIGS. 4 and 5. As one example, motion compensation unit 162 and/or intra prediction unit 164 may be configured to perform any or all of the techniques described in this disclosure. In one embodiment, the video decoder 30 may optionally include inter-layer prediction unit 166 that is configured to perform any or all of the techniques described in this disclosure. In other embodiments, inter-layer prediction can be performed by prediction processing unit 152 (e.g., motion compensation unit 162 and/or intra prediction unit 164), in which case the inter-layer prediction unit 166 may be omitted. However, aspects of this disclosure are not so limited. In some examples, the techniques described in this disclosure may be shared among the various components of the video decoder 30. In some examples, additionally or alternatively, a processor (not shown) may be configured to perform any or all of the techniques described in this disclosure.

For purposes of explanation, this disclosure describes the video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of the video decoder 30 may be duplicated for processing of a multi-layer codec.

In the example of FIG. 3A, the video decoder 30 includes a plurality of functional components. The functional components of the video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, the video decoder 30 may perform a decoding pass generally reciprocal to the encoding pass described with respect to the video encoder 20 of FIG. 2A. In other examples, the video decoder 30 may include more, fewer, or different functional components.

The video decoder 30 may receive a bitstream that comprises encoded video data. The bitstream may include a plurality of syntax elements. When the video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, the video decoder 30 may perform a reconstruction operation on the non-partitioned CU. To perform the reconstruction operation on a non-partitioned CU, the video decoder 30 may perform a reconstruction operation on each TU of the CU. By performing the reconstruction operation for each TU of the CU, the video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by the video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from the video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by the video encoder 20 during generation of the predicted video block of the PU to calculate interpolated values for sub-integer samples of a reference block. Motion compensation unit 162 may determine the interpolation filters used by the video encoder 20 according to received syntax information and use the interpolation filters to produce the predicted video block.

As further discussed below with reference to FIGS. 6-7, the prediction processing unit 152 may code (e.g., encode or decode) the PU (or any other reference layer and/or enhancement layer blocks or video units) by performing the methods illustrated in FIGS. 6-7. For example, motion compensation unit 162, intra prediction unit 164, or inter-layer prediction unit 166 may be configured to perform the methods illustrated in FIGS. 6-7, either together or separately.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, the video decoder 30 may also include inter-layer prediction unit 166. Inter-layer prediction unit 166 is configured to predict a current block (e.g., a current block in the EL) using one or more different layers that are available in SVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, the video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, the video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, the video decoder 30 may perform, based on the video blocks in decoded picture buffer 160, intra prediction or inter prediction operations on PUs of other CUs.

Multi-Layer Decoder

Figure 3B:
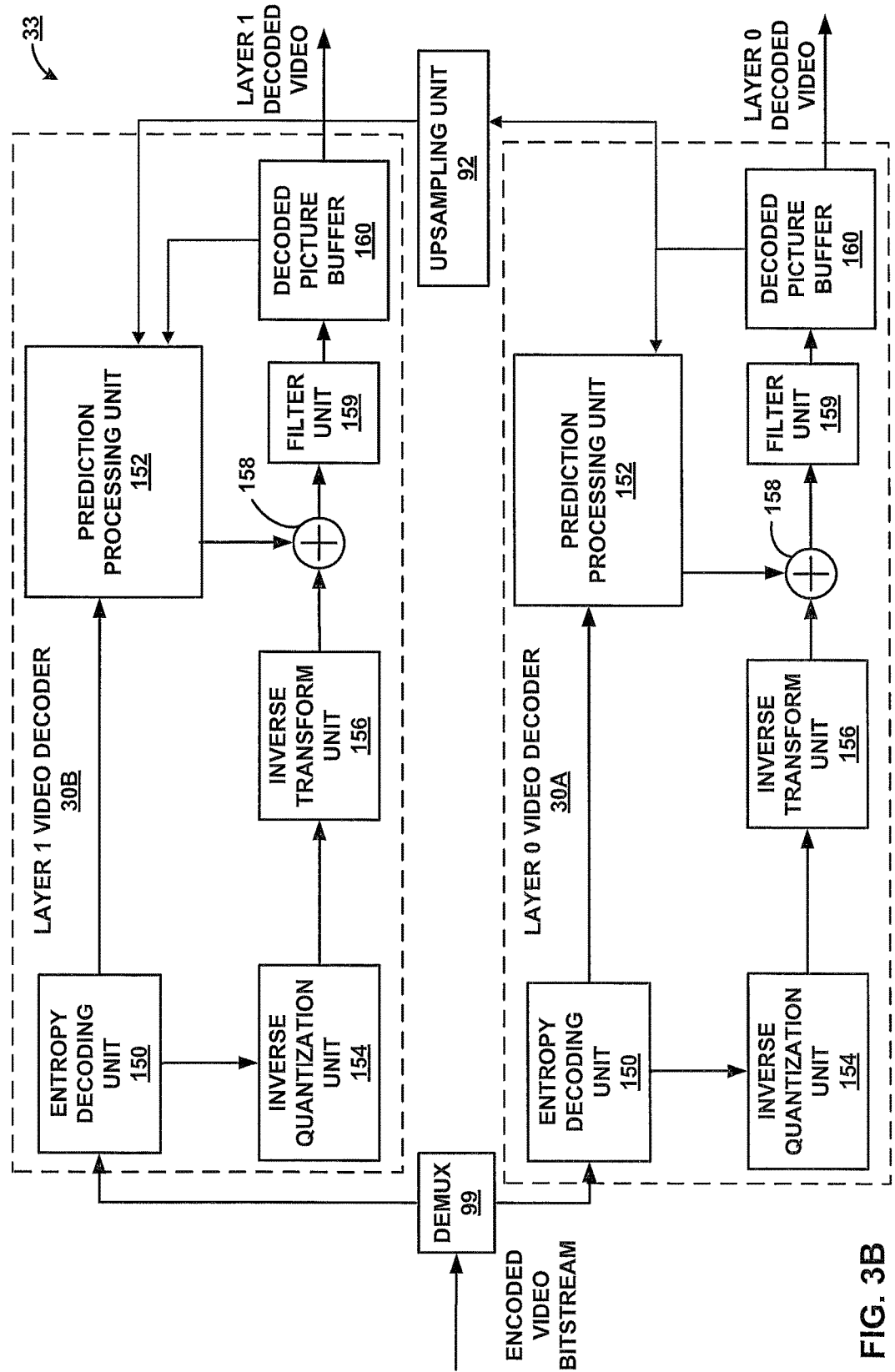
FIG. 3B is a block diagram illustrating an example of a video decoder that may implement techniques in accordance with aspects described in this disclosure.

FIG. 3B is a block diagram illustrating an example of a multi-layer video decoder 33 (also simply referred to as video decoder 33) that may implement techniques in accordance with aspects described in this disclosure. The video decoder 33 may be configured to process multi-layer video frames, such as for SHVC and multiview coding. Further, the video decoder 33 may be configured to perform any or all of the techniques of this disclosure.

The video decoder 33 includes a video decoder 30A and video decoder 30B, each of which may be configured as the video decoder 30 and may perform the functions described above with respect to the video decoder 30. Further, as indicated by the reuse of reference numbers, the video decoders 30A and 30B may include at least some of the systems and subsystems as the video decoder 30. Although the video decoder 33 is illustrated as including two video decoders 30A and 30B, the video decoder 33 is not limited as such and may include any number of video decoder 30 layers. In some embodiments, the video decoder 33 may include a video decoder 30 for each picture or frame in an access unit. For example, an access unit that includes five pictures may be processed or decoded by a video decoder that includes five decoder layers. In some embodiments, the video decoder 33 may include more decoder layers than frames in an access unit. In some such cases, some of the video decoder layers may be inactive when processing some access units.

In addition to the video decoders 30A and 30B, the video decoder 33 may include an upsampling unit 92. In some embodiments, the upsampling unit 92 may upsample a base layer of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 160 of the lower layer decoder (e.g., the video decoder 30A) and to upsample the picture (or the received picture information). This upsampled picture may then be provided to the prediction processing unit 152 of a higher layer decoder (e.g., the video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of the video decoder 30A may be provided directly, or at least without being provided to the upsampling unit 92, to the prediction processing unit 152 of the video decoder 30B. For example, if video data provided to the video decoder 30B and the reference picture from the decoded picture buffer 160 of the video decoder 30A are of the same size or resolution, the reference picture may be provided to the video decoder 30B without upsampling. Further, in some embodiments, the upsampling unit 92 may be a resampling unit 90 configured to upsample or downsample a reference picture received from the decoded picture buffer 160 of the video decoder 30A.

As illustrated in FIG. 3B, the video decoder 33 may further include a demultiplexor 99, or demux. The demux 99 can split an encoded video bitstream into multiple bitstreams with each bitstream output by the demux 99 being provided to a different video decoder 30A and 30B. The multiple bitstreams may be created by receiving a bitstream and each of the video decoders 30A and 30B receives a portion of the bitstream at a given time. While in some cases the bits from the bitstream received at the demux 99 may be alternated one bit at a time between each of the video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of the video decoders 30A and 30B. For instance, two blocks may be provided to the video decoder 30B for each block provided to the video decoder 30A. In some embodiments, the division of the bitstream by the demux 99 may be preprogrammed. In other embodiments, the demux 99 may divide the bitstream based on a control signal received from a system external to the video decoder 33, such as from a processor on a destination device including the destination device 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by the video decoder 33.

Intra Random Access Point (IRAP) Pictures

Some video coding schemes may provide various random access points throughout the bitstream such that the bitstream may be decoded starting from any of those random access points without needing to decode any pictures that precede those random access points in the bitstream. In such video coding schemes, pictures that follow a random access point in output order (e.g., including those pictures that are in the same access unit as the picture providing the random access point) can be correctly decoded without using any pictures that precede the random access point. For example, even if a portion of the bitstream is lost during transmission or during decoding, a decoder can resume decoding the bitstream starting from the next random access point. Support for random access may facilitate, for example, dynamic streaming services, seek operations, channel switching, etc. In some cases, pictures that follow a random access point in output order may use leading pictures for decoding. Leading pictures may refer to pictures that follow the random access point in the bitstream and are output and displayed before the random access point.

In some coding schemes, such random access points may be provided by pictures that are referred to as IRAP pictures. For example, a random access point (e.g., provided by an enhancement layer IRAP picture) in an enhancement layer ("layerA") contained in an access unit ("auA") may provide layer-specific random access such that for each reference layer ("layerB") of layerA (e.g., a reference layer being a layer that is used to predict layerA) having a random access point contained in an access unit ("auB") that is in layerB and precedes auA in decoding order (or a random access point contained in auA), the pictures in layerA that follow auB in output order (including those pictures located in auB), may be correctly decodable without needing to decode any pictures in layerA that precede auB. For example, when decoding starts from auB, and a picture in layerB and in auB is decodable, then the picture in layer A that is in auA and pictures in layerA that follow auA are decodable.

IRAP pictures may be coded using intra prediction (e.g., coded without referring to other pictures in the same layer), and may include, for example, instantaneous decoding refresh (IDR) pictures, clean random access (CRA) pictures, and broken link access (BLA) pictures. When there is an IDR picture in the bitstream, the pictures that precede the IDR picture in decoding order are not used for prediction by pictures that follow the IDR picture in decoding order. When there is a CRA picture in the bitstream, the pictures that follow the CRA picture may or may not use pictures that precede the CRA picture in decoding order for prediction. Those pictures that follow the CRA picture in decoding order but use pictures that precede the CRA picture in decoding order may be referred to as random access skipped leading (RASL) pictures. Another type of picture that follows an IRAP picture in decoding order and precedes the IRAP picture in output order is a random access decodable leading (RADL) picture, which may not contain references to any pictures that precede the IRAP picture in decoding order. RASL pictures may be discarded by the decoder if the pictures that precede the CRA picture are not available. RASL pictures may or may not be present after a BLA picture. When RASL pictures are present after BLA pictures, they should be ignored and/or not decoded because their reference pictures may not be available. An access unit (e.g., a group of pictures including the coded pictures associated with the same output time across multiple layers) containing a base layer picture (e.g., a picture having a layer ID value of 0) that is an IRAP picture may be referred to as an IRAP access unit.

Cross-Layer Alignment of IRAP Pictures

In SHVC extensions such as SHVC and MV-HEVC, IRAP pictures may not be required to be aligned (e.g., contained in the same access unit) across different layers. For example, if IRAP pictures were required to be aligned, any access unit containing at least one IRAP picture would only contain IRAP pictures. On the other hand, if IRAP pictures were not required to be aligned, in a single access unit, one picture (e.g., in a first layer) may be an IRAP picture, and another picture (e.g., in a second layer) may be a non-IRAP picture. Having such non-aligned IRAP pictures in a bitstream may provide some advantages. For example, in a two-layer bitstream, if there are more IRAP pictures in the base layer than in the enhancement layer, in broadcast and multicast applications, low tune-in delay and higher coding efficiency can be achieved.

In some video coding schemes, a POC may be used to keep track of the relative order in which the decoded pictures are displayed. Some of such coding schemes may cause the POC values to be reset (e.g., set to zero or set to some value signaled in the bitstream) whenever certain types of pictures appear in the bitstream. For example, the POC values of certain IRAP pictures may be reset, causing the POC values of other pictures preceding those IRAP pictures in decoding order to also be reset. This may be problematic when the IRAP pictures are not required to be aligned across different layers. For example, when one picture ("picA") is an IRAP picture and another picture ("picB") in the same access unit is not an IRAP picture, the POC value of a picture ("picC"), which is reset due to picA being an IRAP picture, in the layer containing picA may be different from the POC value of a picture ("picD"), which is not reset, in the layer containing picB, where picC and picD are in the same access unit. This causes picC and picD to have different POC values even though they belong to the same access unit (e.g., same output time). Thus, in this example, the derivation process for deriving the POC values of picC and picD can be modified to produce POC values that are consistent with the definition of POC values and access units.

Temporal Motion Vector Prediction Indication and Representation Format Update for Multi-Layer Codecs Early versions of SHVC and MV-HEVC (e.g., SHVC Working Draft 6, MV-HEVC Working Draft 8, etc.) implement a restriction that temporal motion vector from pictures that precede the current picture in decoding order should not be used in TMVP of any pictures that follow the current picture in decoding order when the values of both slice_temporal_mvp_enabled_flag and temporal ID of the current picture are equal to 0 and when the pictures belong to the base layer (e.g., a layer having layer ID=0). According to certain aspects, in this disclosure, preceding pictures of the current picture may refer to preceding pictures in decoding order, and subsequent pictures of the current picture may refer to subsequent pictures in decoding order. Slice_temporal_mvp_enabled_flag can indicate whether the current picture in a slice can use TMVP, for example, based on preceding pictures of the current picture as reference pictures (e.g., collocated pictures). A bitstream may support temporal scalability and provide different frame rates depending on the embodiment. In one embodiment, a temporal layer with temporal ID=0 can provide the default frame rate. The temporal layer with temporal ID=0 can be referred to as the base temporal sublayer. There can be one or more temporal sublayers, and a constraint can apply for inter prediction that pictures in a lower temporal sublayer should not use pictures in a higher temporal sublayer as references. The restriction and the condition that the pictures belong to the base layer were introduced, for example, to allow the enhancement layer to use TMVP. However, the enhancement layer may use TMVP without limiting the restriction to the base layer. Certain details relating to the restrictions and issues associated with the restriction are discussed in further detail below, for example, in sections describing semantics of slice_temporal_mvp_enabled_flag and semantics of prev_pics_not_used_flag.

The early versions of SHVC and MV-HEVC also add a new SEI message called TMVP constraints SEI message, which provides an indication of whether pictures of the current layer that precede the current picture should not be used as collocated pictures in TMVP for any subsequent picture of the same layer. For example, the TMVP constraints SEI message can include a flag called prev_pics_not_used_flag that indicates whether the preceding pictures of the current picture in the current layer in decoding order can be used for TMVP of subsequent pictures of the current picture in the current layer in decoding order. However, the semantics of prev_pics_not_used_flag in the early versions of SHVC and MV-HEVC can lead to a conflict with slice_temporal_mvp_enabled_flag. For instance, slice_temporal_mvp_enabled_flag in the slice header of the slice containing the current picture is equal to 1 and indicates that the current picture can use TMVP, referring to preceding pictures of the current picture as collocated pictures, but prev_pics_not_used_flag in the TMVP constraints SEI message for the current picture is equal to 1 and indicates that subsequent pictures of the current picture in decoding should not use preceding pictures of the current picture for TMVP in decoding order. In such case, any error introduced in the TMVP of the current picture using preceding pictures may be propagated to the subsequent pictures since the subsequent pictures could use the current picture as a collocated picture for TMVP. Although the subsequent pictures are not using any preceding pictures of the current picture for TMVP, the subsequent pictures may use the current picture itself for TMVP. Certain details relating to the flag and the TMVP constraints SEI message and related issues are discussed in further detail below, for example, in sections describing Semantics of slice_temporal_mvp_enabled_flag and semantics of prev_pics_not_used_flag.

In order to address these and other challenges, the techniques according to certain aspects can apply the restriction that temporal motion vector from any preceding pictures of the current picture should not be used in TMVP of any subsequent pictures of the current picture in decoding order to all layers. For example, the restriction can apply to pictures when slice_temporal_mvp_enabled_flag=0 and temporal ID=0 regardless of whether the pictures belong to the base layer or other layers. In one example, the TMVP constraints SEI message can be used with slice_temporal_mvp_enabled_flag to allow an enhancement layer to use TMVP without limiting the restriction to the base layer.

Moreover, the techniques can modify the semantics of prev_pics_not_used_flag, for example, to resolve the conflict between slice_temporal_mvp_enabled_flag for the current picture and prev_pics_not_used_flag for the current picture. For instance, prev_pics_not_used_flag can take a higher precedence than slice_temporal_mvp_enabled_flag. In one example, prev_pics_not_used_flag is modified to indicate that preceding pictures of the current picture should not be used for TMVP of the current picture as well as the subsequent pictures of the current picture in decoding order. If the value of prev_pics_not_used_flag is equal to 1, the preceding pictures are not used for TMVP of the current picture or its subsequent pictures. When the preceding pictures are not used for TMVP, motion vectors of the preceding pictures can be removed, for example, from motion vector storage.

The restriction imposed by slice_temporal_mvp_enabled_flag and the restriction imposed by prev_pics_not_used_flag may be implemented for error resilience purposes. Error resilience may refer to preventing or reducing propagation of error to other pictures when it is detected that an error has occurred, for instance, in the decoding process. Not referring to pictures with errors for prediction can stop the error from affecting the quality of the other pictures. However, when both slice_temporal_mvp_enabled_flag and prev_pics_not_used_flag are equal to 1, any error in the TMVP of the current picture can still be introduced in the TMVP of the subsequent pictures of the current picture in decoding order. By disallowing both the current picture and the subsequent pictures from using the preceding pictures of the current picture in TMVP, error resilience can be significantly improved and increased.

According to certain aspects, the condition that the restriction imposed by slice_temporal_mvp_enabled_flag should be limited to the base layer was implemented to allow use of error resilience feature while still allowing enhancement layer to use TMVP. However, the enhancement layer can still use TMVP along with error resilience feature without the condition of limiting to the base layer. For example, slice_temporal_mvp_enabled_flag and prev_pics_not_used_flag can be both equal to 1. As explained above, the modified semantics of prev_pics_not_used_flag further enhances the error resilience aspect since any error in the prediction of the current picture can be prevented from affecting the prediction of the subsequent pictures of the current picture in decoding order.

Further, in the early versions of SHVC and MV-HEVC, the values of syntax elements or flags in a VPS are used to constrain the values of corresponding syntax elements or flags in a SPS. The VPS and the SPS can both include representation format information. The representation format information can include picture width and height (e.g., picture size), bit depth of chroma components, bit depth of luma components, color plane information, conformance window size. The VPS can apply to all the layers, and generally, one VPS can be defined for a bitstream. The SPS can be specific to a particular layer, and multiple SPSs can be present if a bitstream includes multiple sequences. In general, the values in the VPS represent the worst case scenario values or maximum values, and the SPS can specify different values that are less than or equal to the values in the VPS as appropriate. Accordingly, the values of syntax elements or flags in the VPS can constrain the values of corresponding syntax elements or flags in the SPS when representation format information is updated for the SPS. Having the worst case scenario values or maximum values in the VPS can be important because these values can be used by the decoder to prepare resources (e.g., memory) for decoding a bitstream; thus, it can be important that any change of representation format made in the SPS should not cause the required resources to exceed the resources that have been prepared. However, for certain syntax elements or flags, it is unclear whether a worst case scenario value or a maximum value is applicable. One example can be a flag having a value of either 0 or 1.

In order to address these and other challenges, the techniques according to certain aspects can remove the constraint for separate_colour_plane_flag in the representation format. Separate_colour_plane_flag can indicate whether the three colour components (e.g., Y, Cb, or Cr) of the chroma format are coded separately or not. When the value of separate_colour_plane_flag is to be updated in an SPS, the techniques does not have to check whether the desired value of separate_colour_plane_flag is less than or equal to the value of separate_colour_plane_flag in the VPS. For example, the required resource for decoding the bitstream is the same regardless of whether the value of separate_color_plan_flag is equal to 0 or 1.

In this way, the value of separate_colour_plane_flag can be updated in the SPS in a more flexible manner, and the update of separate_colour_plane_flag in representation format can be more efficient.

Semantics of slice_temporal_mvp_enabled_flag

In the early versions of SHVC and MV-HEVC, the semantics of slice_temporal_mvp_enabled_flag is defined as follows. The changes are relative to prior versions of the early versions (e.g., based on JCTVC-0189). Additions to the prior versions of SHVC and MV-HEVC are indicated in italics.

TABLE 1

Semantics of slice_temporal_mvp_enabled_flag in Early Versions of SHVC and MV-HEVC

*Let currLayerId be equal to nuh_layer_id of the current NAL unit.* When NumDirectRefLayers[ currLayerId ] *is equal to 0,* slice_temporal_mvp_enabled_flag *is equal to 0,* and TemporalId *is* equal to 0, the syntax elements for all coded pictures *with nuh_layer_id equal to currLayerId* that follow the current picture in decoding order shall be constrained such that no temporal motion vector from any picture that precedes the current picture in decoding order is used in decoding of any coded picture *with nuh_layer_id equal to currLayerId* that follows the current picture in decoding order.
NOTE 7 - *When NumDirectRefLayers[ currLayerId ] is equal to 0 and* slice_temporal_mvp_enabled_flag is equal to 0 in an I slice, it has no impact on the normative decoding
process of the picture but merely expresses a bitstream constraint.
NOTE 8 - When *NumDirectRefLayers[ currLayerId ] is equal to 0 and* slice_temporal_mvp_enabled_flag is equal to 0 in a slice with TemporalId equal to 0, decoders may empty "motion vector storage" for all reference pictures *with nuh_layer_id equal to currLayerId* in the decoded picture buffer.

The addition of a supplemental enhancement information (SEI) message, called TMVP constraints SEI message, provides an indication of whether pictures of the current layer that precede, in decoding order, the current picture shall not be used as collocated pictures in TMVP for any subsequent picture, in decoding order, of the same layer.

With the above two adopted changes, issues remain with existing techniques for the indication of the use of TMVP. Such issues are explained below.

In HEVC, the restriction imposed by slice_temporal_mvp_enabled_flag equal to 0 for a picture with TemporalId equal to 0 was for error resilience purpose. When the restriction is applied, the decoder could empty the motion vectors of earlier pictures when the current picture has both slice_temporal_mvp_enabled_flag and TemporalId equal to 0.

The addition of the condition "NumDirectRefLayers[currLayerId] is equal to 0" from the first change resulted in that the restriction applies only to independent layers. A motivation for this change was to allow TMVP for decoding an enhancement layer picture (using motion vectors from the picture of a reference layer in the same access unit) while at the same time making it possible to indicate that the error resilience constraint is applied. However, the motivation may be met without the addition of the condition, because the enhancement layer picture can have slice_temporal_mvp_enabled_flag equal to 1 while at the same time have the TMVP constraints SEI message with prev_pics_not_used_flag equal to 1. When the condition is removed, the semantics of slice_temporal_mvp_enabled_flag would be consistent for all layers in a way that is aligned with HEVC version1 (i.e., the HEVC WD as cited above).

Semantics of prev_pics_not_used_flag

In the early versions of SHVC and MV-HEVC, the semantics of prev_pics_not_used_flag in the TMVP constraints SEI message is defined as follows:

TABLE 2

Semantics of prev_pics_not_used_flag in Early Versions of SHVC and MV-HEVC prev_pics_not_used_flag equal to 1 indicates that the syntax elements for all coded pictures that follow the accessunit containing the current picture in decoding order are constrained such that no temporal motion vector from any picture that has nuh_layer_id equal to any value in associatedLayerIdList and precedes the access unit containing the current picture in decoding order is used in decoding of any coded picture that follows the access unit containing the current picture in decoding order.
prev_pics_not_used_flag equal to 0 indicates that the bitstream may or may not fulfill the constraints indicated by prev_pics_not_used_flag equal to.
  NOTE - When prev_pics_not_used_flag is equal to 1, decoders may empty the "motion vector storage" for all reference pictures with nuh_layer_id equal to any value in associatedLayerIdList in the decoded picture buffer.
prev_pics_not_used_flag shall be equal to 1, when all of the following conditions are true:
  - no_intra_layer_col_pic_flag is equal to 1 in the previous motion vector prediction constraints SEI message applying to nuh_layer_id equal to currLayerId.
  - There is no IDR or BLA picture with nuh_layer_id equal to currLayerId following, in decoding order, the previous motion vector prediction constraints SEI message applying to nuh_layer_id equal to curLayerId, and preceding, in decoding order, the current motion vector prediction constraints SEI message.
  - There is no IRAP access unit with NoClrasOutputFlag equal to 1 following, in decoding order, the previous motion vector prediction constraints SEI message applying to nuh_layer_id equal to curLayerId, and preceding, in decoding order, the current motion vector prediction constraints SEI message.

Figure 4:
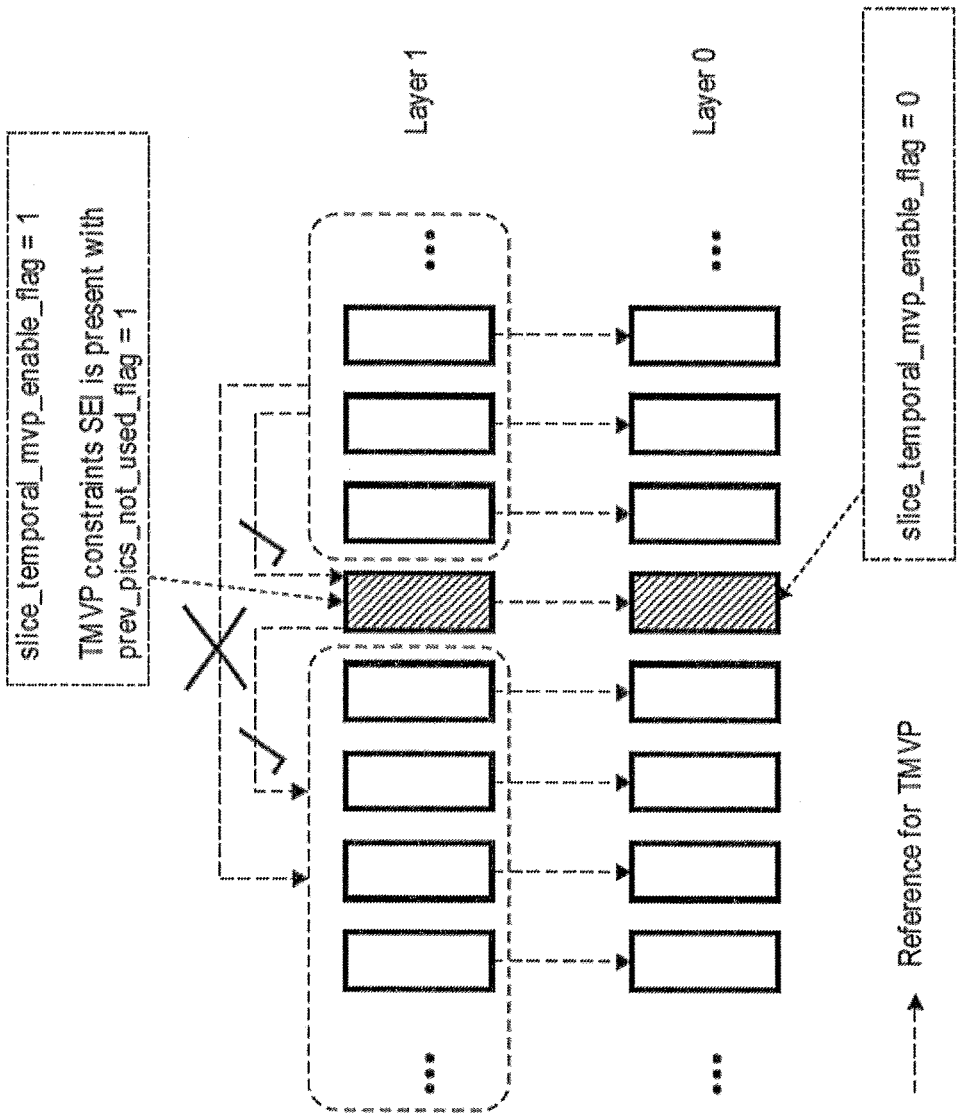
FIG. 4 is a block diagram illustrating an example configuration of pictures in different layers.

FIG. 4 illustrates an issue with the existing semantics of prev_pics_not_used_flag. In this example, the Layer 1 picture that is shaded is associated with a TMVP constraints SEI message with prev_pics_not_used_flag equal to 1. When the value of the syntax element is equal to 1 in a TMVP constraints SEI message associated with the current picture, it is possible that the current picture uses earlier pictures, in decoding order, from the same layer as collocated pictures for TMVP. Also, it is possible for pictures that succeed the current picture, in decoding order, from the same layer to use the current picture as the collocated picture for TMVP. Consequently, the error resilience feature, thought to be achieved by setting prev_pics_not_used_flag equal to 1, may not be achieved as indirect collocated reference is possible, such that if an error occurs to an earlier picture in the same layer in decoding order than the current picture, it is possible that the error propagates to later pictures in the same layer in decoding order.

Motion Vector Prediction Error Resilience in the Multi-Layer Context

Figure 5:
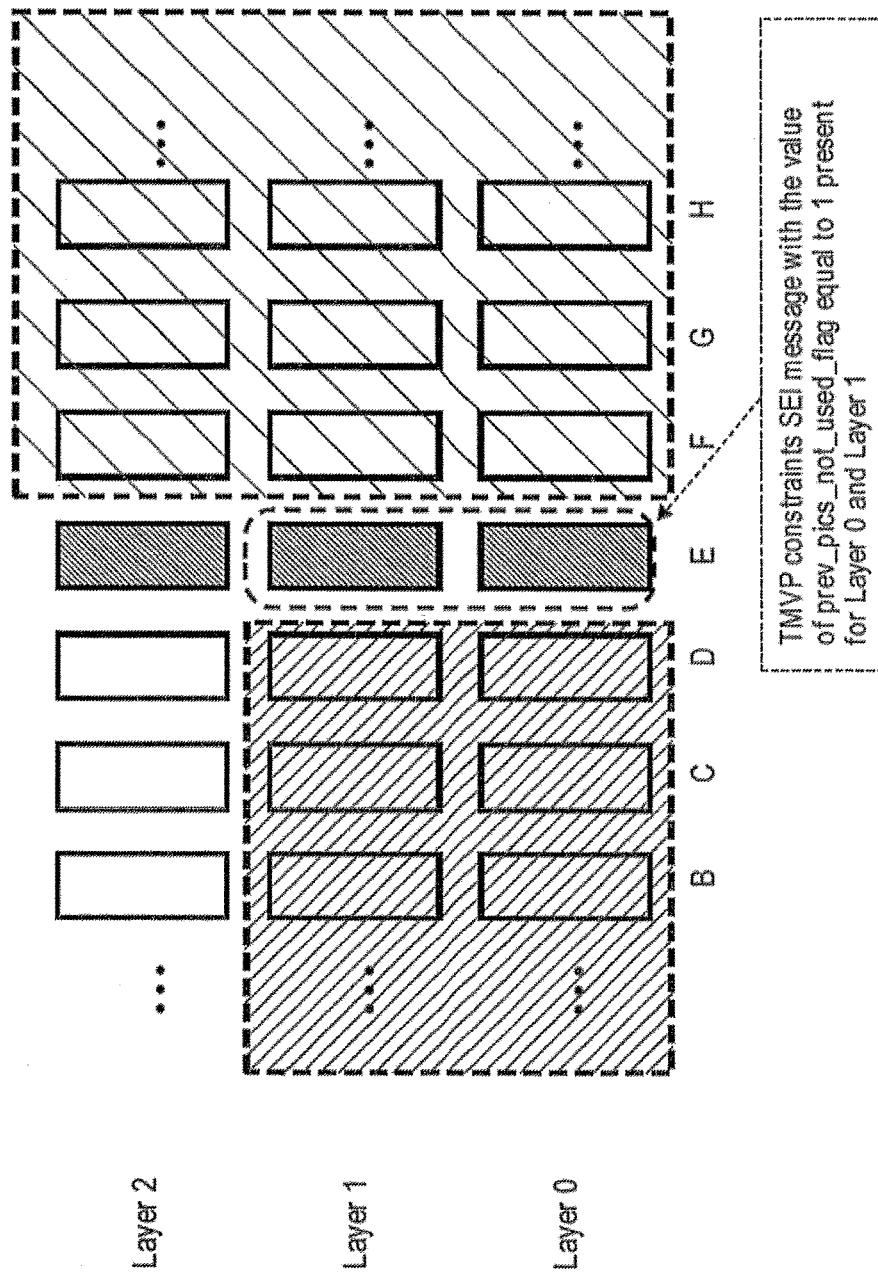
FIG. 5 is a block diagram illustrating an example configuration of pictures in different layers.

The TMVP constraints SEI message provides error resilience (ER) feature as it can stop propagation of incorrect motion vector prediction if there was error (e.g., picture loss). However, the ER feature provided by the SEI message is only for layers that contain the SEI message, not for all layers. For example, if a bitstream has 3 layers and a TMVP constraints SEI message is present for only layer 0 and layer 1 only, the correct motion vector prediction can be guaranteed only for pictures with layer 0 or layer 1 that succeed the access unit that contains the SEI message, in decoding order, but not for pictures in layer 2 that succeed the access unit that contains the SEI message. FIG. 5 illustrates such an example. TMPV constraint SEI messages being contained only in layer 0 and layer 1 within access unit (AU) E means when the value of prev_pics_not_used_flag of the SEI message is equal to 1, all pictures in AU F, AU G, and AU H, and so forth cannot use pictures from layer 0 and layer 1 of AU D, AU C, AU B, and any earlier AUs. This will only guarantee that motion vector predictions for picture in layer 0 and layer 1 of AU F, AU G, AU H, and so forth will be correct if there was error in one of the pictures in layer 0 or layer 1 of AU before AU E. Layer 2 picture of AU F can, for example, use Layer 2 picture of AU D for TMVP reference and Layer 2 picture of AU D can use Layer 1 picture of AU D for TMVP reference. This results in indirect reference for TMVP such that ER is not guaranteed for Layer 2 in this example.

Update of separate_color_plane_flag

In the early versions of SHVC and MV-HEVC, the representation format syntax structure in the VPS specifies, for each layer, the parameters that are needed to describe some essential properties of the coded picture, including picture width, picture height, bit depth of the luma and chroma components, as well as chroma format and how the colour planes are coded. In SPSs that have nuh_layer_id greater than 0, the representation format parameters are allowed to be updated using the update_rep_format_flag indication. For a layer that has nuh_layer_id greater than 0 and that refers to an SPS with nuh_layer_id greater than 0, when the SPS has update_rep_format_flag equal to 1, the updated representation format parameters are restricted to be less than that signaled in the representation format parameters in the VPS corresponding to that layer. The inference rules and constraints on these parameters are given below, where the italicized paragraph is of relevance to the subject of discussion:

TABLE 3

Updating Representation Format in Early Versions of SHVC and MV-HEVC sps_rep_format_idx specifies the index, into the list of rep_format( ) syntax structures in the VPS, of the rep_format( ) syntax structure that applies to the layers that refer to this SPS. When not present, the value of sps_rep_format_idx is inferred to be equal to 0. The value of sps_rep_format_idx shall be in the range of 0 to vps_num_rep_formats_minus1, inclusive.
When a current picture with nuh_layer_id layerIdCurr greater than 0 refers to an SPS, the values of chroma_format_idc, separate_colour_plane_flag, pic_width_in_luma_samples, pic_height_in_luma_samples, bit_depth_luma_minus8, and bit_depth_chroma_minus8 are inferred or constrained as follows:

TABLE 3-continued

Updating Representation Format in Early Versions of SHVC and MV-HEVC

- The variable repFormatIdx is derived as follows:
    - If update rep format flag is equal to 0, the variable repFormatIdx is set equal to vps_rep_format_idx[ LayerIdxInVps[ layerIdCurr ] ].
    - Otherwise, (update_rep_format_flag is equal to 1), the variable repFormatIdx is set equal to sps_rep_format_idx.
- If the nuh_layer_id of the active SPS for the layer with nuh_layer_id equal to layerIdCurr is equal to 0, the values of chroma_format_idc, separate_colour_plane_flag, pic_width_in_luma_samples, pic_height_in_luma_samples, bit_depth_luma_minus8, and bit_depth_chroma_minus8 are inferred to be equal to chroma_format_vps_idc, separate_colour_plane_vps_flag, pic_width_vps_in_luma_samples, pic_height_vps_in_luma_samples, bit_depth_vps_luma_minus8, and bit_depth_vps_chroma_minus8, respectively, of the repFormatIdx-th rep_format( ) syntax structure in the active VPS and the values of chroma_format_idc, separate_colour_plane_flag, pic_width_in_luma_samples, pic_height_in_luma_samples, bit_depth_luma_minus8, and bit_depth_chroma_minus8 of the active SPS for the layer with nuh_layer_id equal to layerIdCurr are ignored.
    NOTE 2 - The values are inferred from the VPS when a non-base layer refers to an SPS that is also referred to by the base layer, in which case the SPS has nuh_layer_id equal to 0. For the base layer, the values of these parameters in the active SPS for the base layer apply.
- Otherwise (the nuh_layer_id of the active SPS for the layer with nuh_layer_id equal to layerIdCurr is greater than zero), the following applies:
    - The values of chroma_format_idc, separate_colour_plane_flag, pic_width_in_luma_samples, pic_height_in_luma_samples, bit_depth_luma_minus8, and bit_depth_chroma_minus8 are inferred to be equal to chroma_format_vps_idc, separate_colour_plane_vps_flag, pic_width_vps_in_luma_samples, pic_height_vps_in_luma_samples, bit_depth_vps_luma_minus8, and bit_depth_vps_chroma_minus8, respectively, of the repFormatIdx-th rep_format( ) syntax structure in the active VPS.
    - *When update_rep_format_flag is equal to 1, it is a requirement of bitstream conformance that the value of chroma_format_idc, separate_colour_plane_flag, pic_width_in_luma_samples, pic_height_in_luma_samples, bit_depth_luma_minus8, or bit_depth_chroma_minus8 shall be less than or equal to chroma_format_vps_idc, separate_colour_plane_vps_flag, pic_width_vps_in_luma_samples, pic_height_vps_in_luma_samples, bit_depth_vps_luma_minus8, or bit_depth_vps_chroma_minus8, respectively, of the vps_rep_format_idx[ j ]-th rep_format( ) syntax structure in the active VPS, where j is equal to LayerIdxInVps[ layerIdCurr ].*

Of the syntax elements included in the italicized constraint above (chroma_format_idc, separate_colour_plane_flag, pic_width_in_luma_samples, pic_height_in_luma_samples, bit_depth_luma_minus8, and bit_depth_chroma_minus8), all the syntax elements except separate_colour_plane_flag specify parameters/variables that have a linear relationship with the value of the syntax element. However, separate_colour_plane_flag does not have such relationship; it describes whether the different colour planes of a picture that refers to the SPS are coded together or coded separately. The semantics of separate_colour_plane_flag are given below:

TABLE 4

Semantics of separate_colour_plane_flag in Early Versions of SHVC and MV-HEVC separate_colour_plane_flag equal to 1 specifies that the three colour components of the 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value. The value of separate_colour_plane_flag shall be less than or equal to separate_colour_plane_vps_flag
    NOTE 3 - There is no dependency in decoding processes between the colour planes having different colour_plane_id values. For example, the decoding process of a monochrome picture with one value of colour_plane_id does not use any data from monochrome pictures having different values of colour_plane_id for inter prediction.
Depending on the value of separate_colour_plane_flag, the value of the variable ChromaArrayType is assigned as follows:
    - If separate_colour_plane_flag is equal to 0, ChromaArrayType is set equal to chroma_format_idc.
    - Otherwise (separate_colour_plane_flag is equal to 1), ChromaArrayType is set equal to 0.

When the representation format parameters of an SPS are updated, and the value of separate_colour_plane_flag of the updated representation format parameter is restricted to be less or equal to a corresponding value in the VPS (as per the constraint above), the following use case is allowed: the colour planes of pictures of a particular layer are specified in the VPS to be coded separately, but it is specified that for pictures of the same layer that refer to a particular SPS that updates the representation format parameters would have colour planes coded together. Use cases where the colour planes are coded for layers differently (together and/or independent) within the same bitstream may not be common. If such use cases do exist where the colour planes are coded differently (together and/or independent) for layers within the same bitstream, then it is unclear why the following case is disallowed: the colour planes of pictures of a layer are specified to be coded together in the VPS, but an updated SPS specifies that the pictures referring to the updated SPS would have the colours planes coded separately.

A motivation of putting the italicized restriction on the update of representation format parameters was to ensure that resources/capabilities indicated as required by the VPS are not exceeded by an updated SPS. However, neither value (0 or 1) of the separate_colour_plane_flag indicates any additional data to be signaled or processed, and hence separate_colour_plane_flag does not need to be considered for this restriction.

TMVP Indication and Representation Format Update in Multi-Layer Codecs

To overcome the above-described issues with existing approaches for the indication of the use of TMVP in multi-layer codecs, this disclosure describes improvements below. In this disclosure, the following described techniques and approaches may be used solely or in any combination:

- Extending the constraint in the semantics of slice_temporal_mvp_enabled_flag such that when the values of both slice_temporal_mvp_enabled_flag and TemporalId of the current picture are equal to 0, the syntax elements for all coded pictures that follow the current picture in decoding order and are in the same layer as the current picture may be constrained, such that no temporal motion vector from any picture that precedes the current picture in decoding order is used in the decoding of any coded picture that follows the current picture in decoding order.
  - This constraint may apply to pictures belonging to any layer.
  - This constraint may allow the decoder to empty motion vector storage when it receives picture with both values of slice_temporal_mvp_enabled_flag and TemporalId are equal to 0.
- Modification of the semantics of prev_pics_not_used_flag in the TMVP constraints SEI message such that when the TMVP constraints SEI message is present and associated with a current picture and the value of the prev_pics_not_used_flag is equal to 1, the current picture is also disallowed to use pictures in the same layer that precede it, in decoding order, as collocated pictures for TMVP.
  - In one example approach, when a TMVP constraints SEI message is present and associated with a current picture and the value of the prev_pics_not_used_flag is equal to 1 and the value of slice_temporal_mvp_enabled_flag of the current picture is equal to 1, only pictures from reference layers of the current layer that have slice_temporal_mvp_enabled_flag equal to 0 may be used as collocated pictures for TMVP.
  - In another example approach, when a TMVP constraints SEI message is present and associated with a current picture and the value of the prev_pics_not_used_flag is equal to 1 and the value of slice_temporal_mvp_enabled_flag of the current picture is equal to 1, all pictures from reference layers of the current layer may have slice_temporal_mvp_enabled_flag set equal to 0.
- Addition of a constraint to the TMVP constraints SEI message such that when a TMVP constraints SEI message with the value of prev_pics_not_used_flag equal to 1 is present for a particular layerA, all layers that refer to layerA directly or indirectly may also contain the TMVP constraints SEI message with the value of prev_pics_not_used_flag equal to 1.
  - In one example approach, the TMVP constraints SEI message is defined to applies to all layers.
  - In another example approach, when prev_pics_not_used_flag equal to 1, prev_pics_not_used_flag may indicate that the syntax elements for all coded pictures that are within or follow the access unit containing the current picture in decoding order are constrained such that no temporal motion vector from any picture that has nuh_layer_id equal to any value in associatedLayerIdList and precedes the access unit containing the current picture in decoding order is used directly or indirectly in decoding of any coded picture that are within or follows the access unit containing the current picture in decoding order. prev_pics_not_used_flag equal to 0 indicates that the bitstream may or may not fulfill the constraints indicated by prev_pics_not_used_flag equal to 1.
- Removal of separate_colour_plane_flag from the restriction on update of representation format parameters, such that when updating representation format, there is no checking required of the value of separate_colour_plane_flag. This allows the bitstream to have separate_colour_plane_flag change value from 0 to 1, and vice versa, flexibly.
  - In one example approach, a constraint is added such that the value of separate_colour_plane_flag shall be the same in all the rep_format( ) syntax structures in a VPS.
  - In another example approach, the syntax element separate_colour_plane_flag is signaled at most once in a VPS, e.g., only in the first rep_format( ) structure and the remaining signaled rep_format( ) in the VPS shall have not the syntax element but rather infer the value from the first structure.

EXEMPLARY EMBODIMENTS

The above mentioned techniques can be implemented as shown in the following examples. The examples are provided in the context of earlier versions of SHVC and MV-HEVC (e.g., SHVC WD 6 and MV-HEVC WD 8). Additions to the earlier versions of SHVC and MV-HEVC are indicated in italics, and deletions from the earlier versions of SHVC and MV-HEVC are indicated in strikethrough.

Exemplary Embodiment 1

This embodiment modifies the restriction on slice_temporal_mvp_enabled_flag. For example, the condition that the restriction be applied to pictures that have slice_temporal_mvp_enabled_flag=0 and temporal ID equal to 0 is applicable to all layers, instead of only the base layer.

TABLE 5

Exemplary Embodiment 1

Let currLayerId be equal to nuh_layer_id of the current NAL unit. When <start_removal> NumDirectRefLayers[ currLayerId ] is equal to 0, <end_removal> slice temporal mvp enabled flag is equal to 0, and TemporalId is equal to 0, the syntax elements for all coded pictures with nuh_layer_id equal to currLayerId that follow the current picture in decoding order shall be constrained such that no temporal motion vector from any picture that precedes the current picture in decoding order is used in decoding of any coded picture with nuh_layer_id equal to currLayerId that follows the current picture in decoding order.
   NOTE 7 - When <start_removal> NumDirectRefLayers[ currLayerId ] is equal to 0 and <end_removal> slice_temporal_mvp_enabled_flag is equal to 0 in an I slice, it has no impact on the normative decoding process of the picture but merely expresses a bitstream constraint.
   NOTE 8 - When <start_removal> NumDirectRefLayers[ currLayerId ] is equal to 0 and <end_removal> slice_temporal_mvp_enabled_flag is equal to 0 in a slice with TemporalId equal to 0, decoders may empty "motion vector storage" for all reference pictures with nuh_layer_id equal to currLayerId in the decoded picture buffer.

Exemplary Embodiment 2

This embodiment modifies the semantics of prev_pics_not_used_flag. For example, the modification adds a constraint such that prev_pics_not_used_flag disallows using pictures that precede the current picture in decoding order for TMVP of the current picture when the value of the flag is set equal to 1.

TABLE 6

Exemplary Embodiment 2 prev_pics_not_used_flag equal to 1 indicates that the syntax elements for all coded pictures that *are within or* follow the access unit containing the current picture in decoding order are constrained such that no temporal motion vector from any picture that has nuh_layer_id equal to any value in associatedLayerIdList and precedes the access unit containing the current picture in decoding order is used *directly or indirectly* in decoding of any coded picture that *are within* or follows the access unit containing the current picture in decoding order. prev_pics_not_used_flag equal to 0 indicates that the bitstream may or may not fulfill the constraints indicated by prev_pics_not_used_flag equal to 1.
   NOTE - When prev_pics_not_used_flag is equal to 1, decoders may empty the "motion vector storage" for all reference pictures with nuh_layer_id equal to currLayerId in the decoded picture buffer.
prev_pics_not_used_flag shall be equal to 1, when all of the following conditions are true:
- no intra_layer_col_pic_flag is equal to 1 in the previous motion vector prediction constraints SEI message applying to nuh_layer_id equal to currLayerId.
- There is no IDR or BLA picture with nuh_layer_id equal to currLayerId following, in decoding order, the previous motion vector prediction constraints SEI message applying to nuh_layer_id equal to curLayerId, and preceding, in decoding order, the current motion vector prediction constraints SEI message.
- There is no IRAP access unit with NoClrasOutputFlag equal to 1 following, in decoding order, the previous motion vector prediction constraints SEI message applying to nuh_layer_id equal to curLayerId, and preceding, in decoding order, the current motion vector prediction constraints SEI message.

Exemplary Embodiment 3

This embodiment modifies the restriction for updating representation format. For example, the restriction that the value of a flag or syntax element in a SPS should be less than or equal the value of corresponding flag or syntax element in a VPS is not applied to separate_colour_plane_flag as follows:

TABLE 7

Exemplary Embodiment 3

When update_rep_format_flag is equal to 1, it is a requirement of bitstream conformance that the value of chroma_format_idc, <start_removal> separate_colour_plane_flag, <end_removal> pic_width_in_luma_samples, pic_height_in_luma_samples, bit_depth_luma_minus8, or bit_depth_chroma_minus8 shall be less than or equal to chroma_format_vps_idc, <start_removal> separate_colour_plane_vps_flag, <end_removal> pic_width_vps_in_luma_samples, pic_height_vps_in_luma_samples, bit_depth_vps_luma_minus8, or bit_depth_vps_chroma_minus8, respectively, of the vps_rep_format_idx[ j ]-th rep_format( ) syntax structure in the active VPS, where j is equal to LayerIdxInVps[ layerIdCurr ].

Method of Restricting Preceding Pictures for Temporal Motion Vector Prediction

Figure 6:
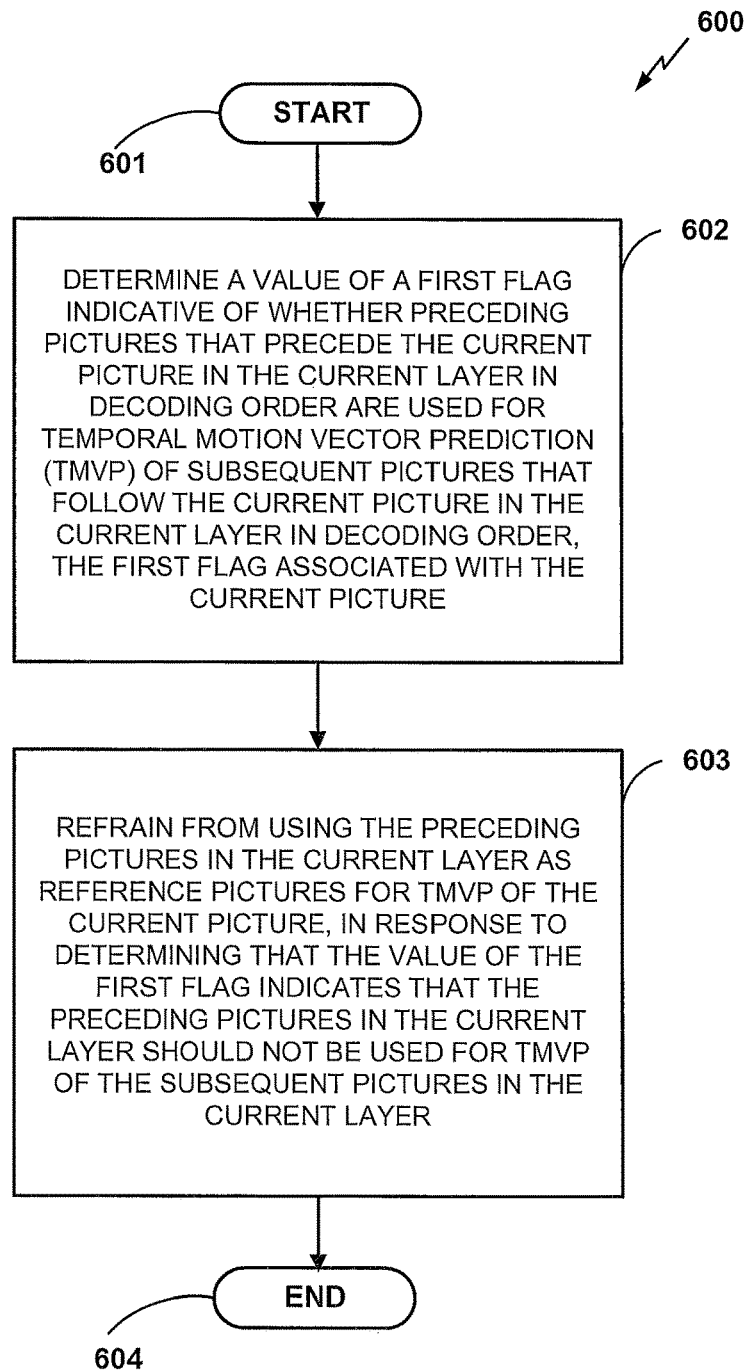
FIG. 6 is a flowchart illustrating a method of coding video information, according to one or more aspects of the present disclosure.

FIG. 6 is a flowchart illustrating a method of coding video information, according to one or more aspects of the present disclosure. The method relates to restricting use of preceding pictures for TMVP. The process 600 may be performed by an encoder (e.g., the encoder as shown in FIG. 2A, 2B, etc.), a decoder (e.g., the decoder as shown in FIG. 3A, 3B, etc.), or any other component, depending on the embodiment. The blocks of the process 600 are described with respect to the decoder 33 in FIG. 3B, but the process 600 may be performed by other components, such as an encoder, as mentioned above. The layer 1 video decoder 30B of the decoder 33 and/or the layer 0 decoder 30A of the decoder 33 may perform the process 600, depending on the embodiment. All embodiments described with respect to FIG. 6 may be implemented separately, or in combination with one another. Certain details relating to the process 600 are explained above, e.g., with respect to FIG. 4-5.

The process 600 starts at block 601. The decoder 33 can include a memory (e.g., decoded picture buffer 160) for storing video information associated with a plurality of layers. The decoder 33 may obtain information associated with a current AU to be coded. The current AU can contain pictures from a plurality of layers. The plurality of layers can include a current layer to be coded, and the current layer can include a current picture to be coded.

At block 602, the decoder 33 determines the value of a first flag indicative of whether preceding pictures that precede the current picture in the current layer in decoding order are used for TMVP of subsequent pictures that follow the current picture in the current layer in decoding order. The first flag may be associated with the current picture. In one embodiment, the first flag is included in a SEI message. The first flag may indicate that the preceding pictures in the current layer should not be used for TMVP of the subsequent pictures in the current layer when the value of the first flag is equal to 1. The first flag may indicate that the preceding pictures in the current layer can be used for TMVP of the current picture and/or the subsequent pictures in the current layer when the value of the first flag is equal to 0. In one embodiment, the first flag comprises prev_pics_not_used_flag. The preceding pictures can precede the current picture in decoding order, and the subsequent pictures can follow the current picture in decoding order. In some embodiments, the current picture comprises an IDR picture.

At block 603, the decoder 33 refrains from using the preceding pictures in the current layer as reference pictures for TMVP of the current picture, in response to determining that the value of the first flag indicates that the preceding pictures in the current layer should not be used for TMVP of the subsequent pictures in the current layer.

In some embodiments, the decoder 33 refrains from accessing a second flag indicative of whether TVMP is enabled. The second flag may be included in the slice header of the slice including the current picture, and the second flag may be associated with the current picture. For example, the decoder 33 refrains from accessing the second flag indicative of whether TVMP is enabled when the value of the first flag is equal to 1. In one embodiment, the decoder 33 refrains from accessing the second flag in response to determining that the value of the first flag indicates that the preceding pictures in the current layer should not be used for TMVP of the subsequent pictures in the current layer. In another embodiment, the second flag comprises slice_temporal_mvp_enabled_flag. In certain embodiments, for all of the plurality of layers in the current AU, the preceding pictures should not be used for TMVP of the current picture when the second flag indicates that TMVP is not enabled and when the current picture is in the base temporal sublayer (e.g., the current picture has a temporal ID equal to 0). In other embodiments, for all of the plurality of layers in the current AU, the preceding pictures should not be used for TMVP of the current picture and subsequent pictures when the second flag indicates that TMVP is not enabled for the current picture and when the current picture is in a base temporal sublayer. The first flag may have a higher precedence than the second flag. In one embodiment, the decoder 33 encodes the video information. In another embodiment, the decoder 33 decodes the video information.

In certain embodiments, the decoder 33 is a wireless communication device, further comprising a receiver configured to receive video data according to at least one radio access technology (RAT), the video data comprising the video information associated with the plurality of layers; and a transmitter configured to operate in accordance with the at least one RAT. The wireless communication device may be a cellular telephone, and the received video data may be received by the receiver and may be modulated according to cellular communication standard.

In some embodiments, the process 600 may be executable on a wireless communication device comprising: a receiver configured to receive video data according to at least one radio access technology (RAT), the video data comprising the video information associated with the plurality of layers; a transmitter configured to operate in accordance with the at least one RAT; a memory configured to store the video data; and a processor configured to execute instructions to process the video data stored in the memory. The wireless communication device may be a cellular telephone, and the received video data may be received by the receiver and may be modulated according to cellular communication standard.

The process 600 ends at block 604. Blocks may be added and/or omitted in the process 600, depending on the embodiment, and blocks of the process 600 may be performed in different orders, depending on the embodiment.

Any features and/or embodiments described with respect to restricting use of preceding pictures for TMVP in this disclosure may be implemented separately or in any combination thereof. For example, any features and/or embodiments described in connection with FIGS. 1-6 and other parts of the disclosure may be implemented in any combination with any features and/or embodiments described in connection with FIG. 6, and vice versa.

Method of Updating Representation Format

Figure 7:
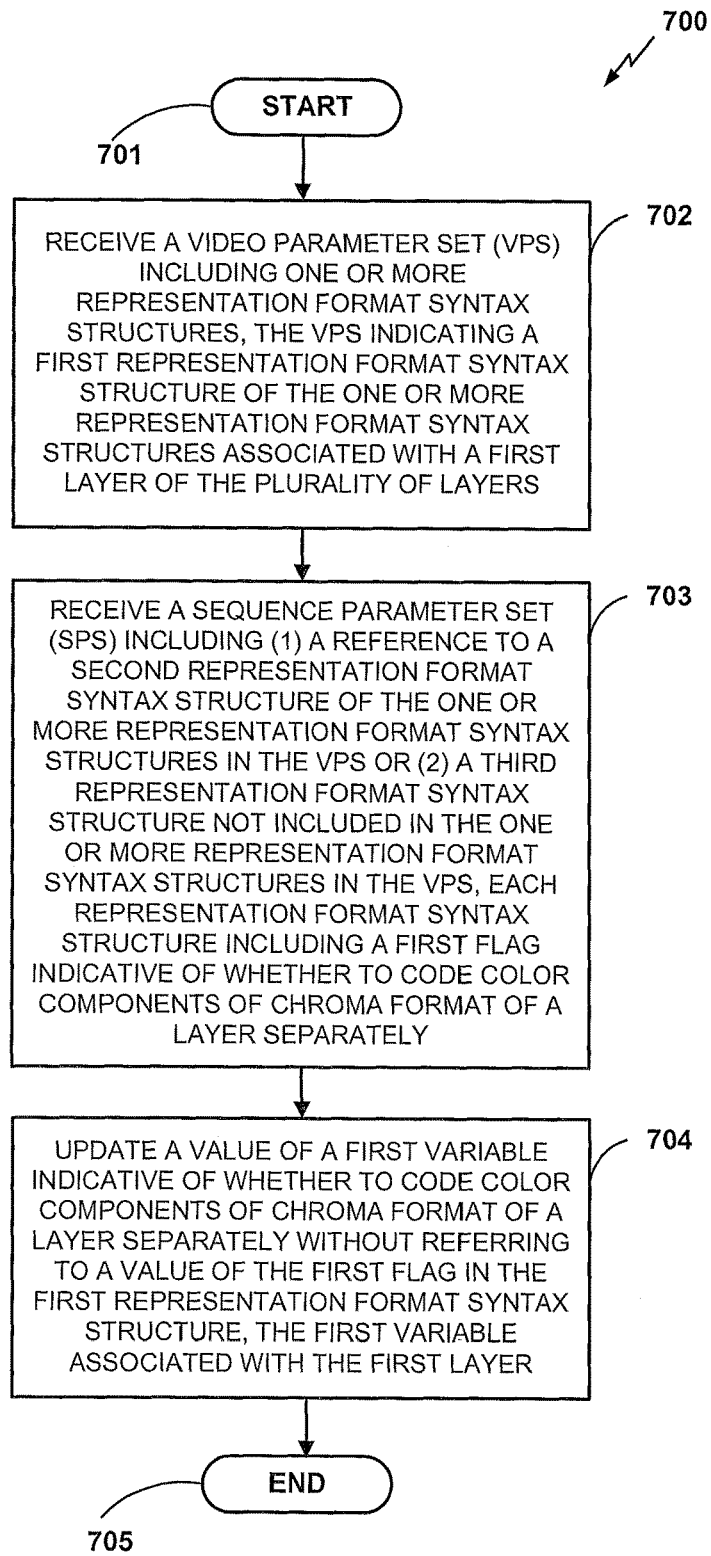
FIG. 7 is a flowchart illustrating a method of coding video information, according to one or more aspects of the present disclosure.

FIG. 7 is a flowchart illustrating a method of coding video information, according to one or more aspects of the present disclosure. The method relates to updating representation format. The process 700 may be performed by an encoder (e.g., the encoder as shown in FIG. 2A, 2B, etc.), a decoder (e.g., the decoder as shown in FIG. 3A, 3B, etc.), or any other component, depending on the embodiment. The blocks of the process 700 are described with respect to the encoder 23 in FIG. 2B, but the process 700 may be performed by other components, such as a decoder, as mentioned above. The layer 1 video encoder 20B of the encoder 23 and/or the layer 0 encoder 20A of the encoder 23 may perform the process 700, depending on the embodiment. All embodiments described with respect to FIG. 7 may be implemented separately, or in combination with one another. Certain details relating to the process 700 are explained above, e.g., with respect to FIG. 4-6.

The process 700 starts at block 701. The encoder 23 can include a memory (e.g., decoded picture buffer 160) for storing video information associated with a plurality of layers.

At block 702, the encoder 23 receives a VPS including one or more representation format syntax structures. The VPS may indicate a first representation format syntax structure of the one or more representation format syntax structures associated with a first layer of the plurality of layers.

At block 703, the encoder 23 receives a SPS including (1) a reference to a second representation format syntax structure of the one or more representation format syntax structures in the VPS or (2) a third representation format syntax structure. The third representation format syntax structure may not be included in the one or more representation format syntax structures in the VPS. Each representation format syntax structure may include a first flag indicative of whether to code color components of chroma format of a layer separately.

At block 704, the encoder 23 updates a value of a first variable indicative of whether to code color components of chroma format of a layer separately without referring to a value of the first flag in the first representation format syntax structure, the first variable associated with the first layer. The encoder 23 may code video data associated with the VPS based on the value of the first variable.

In some embodiments, the SPS includes the reference to the second representation format syntax structure, and the encoder 23 updates the value of the first variable to be equal to the value of the first flag in the second representation format syntax structure. Each representation format syntax structure can include one or more second flags in addition to the first flag, and the encoder 23 can update values of one or more second variables corresponding to the one or more second flags to values of the one or more second flags in the second representation format syntax structure when the values of one or more second flags in the second representation format syntax structure are less than or equal to values of the one or more second flags in the first representation format syntax structure. The one or more second variables may be associated with the first layer.

In certain embodiments, the SPS includes the third representation format syntax structure, and the encoder 23 updates the value of the first variable to be equal to the value of the first flag in the third representation format syntax structure. Each representation format syntax structure can include one or more second flags in addition to the first flag, and the encoder 23 updates values of one or more second variables corresponding to the one or more second flags to values of the one or more second flags in the third representation format syntax structure when the values of one or more second flags in the third representation format syntax structure are less than or equal to values of the one or more second flags in the first representation format syntax structure. The one or more second variables may be associated with the first layer.

The VPS may include a mapping of which of the one or more representation format syntax structures is associated with respective layer of the plurality of layers. The first flag may indicate that color components of chroma format should be coded of a layer separately when the value of the first flag is equal to 1, and the first variable may indicate that color components of chroma format of a layer should be coded separately when the value of the first variable is equal to 1. The first flag may indicate that color components of chroma format of a layer should not be coded separately when the value of the first flag is equal to 0, and the first variable may indicate that color components of chroma format of a layer should not be coded separately when the value of the first variable is equal to 0. In one embodiment, the first flag comprises separate_colour_plane_vps_flag, and the first variable comprises separate_colour_plane_flag. In another embodiment, the reference to the second representation format syntax structure comprises sps_rep_format_idx. The VPS can apply to all of the plurality of layers, and the SPS can apply to a particular layer among the plurality of layers. In one embodiment, the encoder 23 encodes the video information.

In certain embodiments, the encoder 23 is a wireless communication device, further comprising a transmitter configured to transmit video data according to at least one radio access technology (RAT); and a receiver configured to operate in accordance with the at least one RAT. The wireless communication device may be a cellular telephone, and the transmitted video data may be transmitted by the transmitter and may be modulated according to cellular communication standard.

In some embodiments, the process 700 may be executable on a wireless communication device comprising: a transmitter configured to transmit video data according to at least one radio access technology (RAT); a receiver configured to operate in accordance with the at least one RAT; a memory configured to store the video data; and a processor configured to execute instructions to process the video data stored in the memory. The wireless communication device may be a cellular telephone, and the transmitted video data may be transmitted by the transmitter and may be modulated according to cellular communication standard.

The process 700 ends at block 704. Blocks may be added and/or omitted in the process 700, depending on the embodiment, and blocks of the process 700 may be performed in different orders, depending on the embodiment.

Any features and/or embodiments described with respect to updating the representation format in this disclosure may be implemented separately or in any combination thereof. For example, any features and/or embodiments described in connection with FIGS. 1-7 and other parts of the disclosure may be implemented in any combination with any features and/or embodiments described in connection with FIG. 7, and vice versa.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware (e.g., computer hardware), software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer readable medium (e.g., a computer-readable data storage medium) comprising program code including instructions that, when executed, performs one or more of the methods described above. The computer readable medium may be a non-transitory computer readable medium. The computer-readable medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the disclosure have been described. These and other embodiments are within the scope of the following claims.

What is claimed is:

1. An apparatus for decoding video data, comprising:
a memory for storing encoded video data associated with one or more video layers of a video bitstream, the encoded video data comprising a motion vector storage that includes only motion vectors for one or more reference pictures included in an associatedLayerIdList, the one or more reference pictures being associated with a current access unit (AU) including a current picture of the encoded video data, wherein the memory comprises a decoded picture buffer; and
processing circuitry operationally coupled to the memory, the processing circuitry being configured to:
obtain, from a temporal motion vector prediction (TMVP) constraints supplemental enhancement information (SEI) message of the encoded video data stored to the memory, a prev_pics_not_used_flag syntax element associated with the current AU including the current picture of the encoded video data stored to the memory;
determine a value of the prev_pics_not_used_flag syntax element obtained from the TMVP constraints SEI message, the value of the prev_pics_not_used_flag syntax element being indicative of whether a picture that precedes the current AU in decoding order is allowed to be used for temporal motion vector prediction (TMVP) of another picture that is included within the current AU or that follows the current AU in decoding order;
based on to a determination that the value of the prev_pics_not_used_flag syntax element is equal to one (1), determine that the picture that precedes the current AU in decoding order is not allowed to be used for TMVP of the other picture that is included within the current AU or that follows the current AU in decoding order, and determine that no picture that precedes the current AU in decoding order is allowed to be used as a reference picture for TMVP of the current picture;
based on the determination that the value of the prev_pics_not_used_flag syntax element is equal to one (1), empty the motion vector storage stored to the memory; and
reconstruct the current picture without using TMVP.

2. The apparatus of claim 1, wherein the current picture comprises an instantaneous decoding refresh (IDR) picture.

3. The apparatus of claim 1, wherein the apparatus comprises one or more of: a desktop computer, a notebook computer, a laptop computer, a tablet computer, a set-top box, a telephone handset, a smart phone, a wireless communication device, a smart pad, a television, a camera, a display device, a digital media player, a video gaming console, or a video streaming device.

4. A method of decoding video information, the method comprising:
receiving a bitstream that includes encoded video data associated with one or more video layers, the encoded video data comprising a motion vector storage that includes only motion vectors for one or more reference pictures included in an associatedLayerIdList, the one or more reference pictures being associated with a current access unit (AU) including a current picture of the encoded video data;

obtaining, from a temporal motion vector prediction (TMVP) constraints supplemental enhancement information (SEI) message of the encoded video data received in the bitstream, a prev_pics_not_used_flag syntax element associated with the current AU including the current picture of the encoded video data received in the bitstream;

determining a value of the prev_pics_not_used_flag syntax element obtained from the TMVP constraints SEI message, the value of the prev_pics_not_used_flag syntax element being indicative of whether a picture that precedes the current AU in decoding order is allowed to be used for temporal motion vector prediction (TMVP) of another picture that is included within the current AU or that follows the current AU in decoding order;

in response to determining that the value of the prev_pics_not_used_flag syntax element is equal to one (1), determining that the value of the first flag indicates that the picture that precedes the current AU in decoding order is not allowed to be used for TMVP of the other picture that is included within the current AU or that follows the current AU in decoding order, and determining that no picture that precedes the current AU in decoding order is allowed to be used as a reference picture for TMVP of the current picture;

in response to determining that the value of the prev_pics_not_used_flag syntax element is equal to one (1), emptying the motion vector storage; and reconstructing the current picture without using TMVP.

5. The method of claim 4, wherein the current picture comprises an instantaneous decoding refresh (IDR) picture.

6. A non-transitory computer readable storage medium comprising instructions that, when executed on a processor comprising computer hardware, cause the processor to:

obtain, from a temporal motion vector prediction (TMVP) constraints supplemental enhancement information (SEI) message of encoded video data of a video bitstream, a prev_pics_not_used_flag syntax element associated with a current access unit (AU) including a current picture of the encoded video data, the encoded video data comprising a motion vector storage that includes only motion vectors for one or more reference pictures included in an associatedLayerIdList, the one or more reference pictures being associated with a current access unit (AU) including a current picture of the encoded video data;

determine a value of the prev_pics_not_used_flag syntax element obtained from the TMVP constraints SEI message, the value of the prev_pics_not_used_flag syntax element being indicative of whether a picture that precedes the current AU in decoding order is allowed to be used for temporal motion vector prediction (TMVP) of another picture that is included within the current AU or that follows the current AU in decoding order;

in response to a determination that the value of the prev_pics_not_used_flag syntax element is equal to one (1), determine that the value of the first flag indicates that the picture that precedes the current AU in decoding order is not allowed to be used for TMVP of the other picture that is included within the current AU or that follows the current AU in decoding order, and determine that no picture that precedes the current AU in decoding order is allowed to be used as a reference picture for TMVP of the current picture;

in response to the determination that the value of the prev_pics_not_used_flag syntax element is equal to one (1), empty the motion vector storage; and reconstruct the current picture without using TMVP.

7. The non-transitory computer-readable storage medium of claim 6, wherein the current picture comprises an instantaneous decoding refresh (IDR) picture.

8. An apparatus for decoding video information, comprising:

means for storing encoded video data associated with one or more video layers of a video bitstream, the encoded video data comprising a motion vector storage that includes only motion vectors for one or more reference pictures included in an associatedLayerIdList, the one or more reference pictures being associated with a current access unit (AU) including a current picture of the encoded video data;

means for obtaining, from a temporal motion vector prediction (TMVP) constraints supplemental enhancement information (SEI) message of the stored encoded video data, a prev_pics_not_used_flag syntax element associated with the current AU including the current picture of the stored encoded video data;

means for determining a value of the prev_pics_not_used_flag syntax element obtained from the TMVP constraints SEI message, the value of the prev_pics_not_used_flag syntax element being indicative of whether a picture that precedes the current AU in decoding order is allowed to be used for temporal motion vector prediction (TMVP) of another picture that is included within the current AU or that follows the current AU in decoding order;

means for emptying the motion vector storage, in response to determining that the value of the prev_pics_not_used_flag syntax element is equal to one (1); and means for determining, in response to determining that the value of the prev_pics_not_used_flag syntax element is equal to one (1), that the value of the first flag indicates that the picture that precedes the current AU in decoding order is not allowed to be used for TMVP of another picture that is within or follows the current AU in decoding order, and determining that no picture that precedes the current AU in decoding order is allowed to be used as a reference picture for TMVP of the current picture; and means for reconstructing the current picture without using TMVP.

9. The apparatus of claim 8, further comprising means for refraining from accessing a second flag indicative of whether TMVP is enabled, the second flag included in a slice header of a slice included in the current picture when the value of the first flag is equal to 1.

10. The apparatus of claim 8, wherein the current picture comprises an instantaneous decoding refresh (IDR) picture.

* * * * *